US010388092B1

(12) United States Patent
Solh et al.

(10) Patent No.: US 10,388,092 B1
(45) Date of Patent: Aug. 20, 2019

(54) COMPUTER VISION-BASED SURVEILLANCE FOR SERVICES

(71) Applicant: Amazon Technologies, Inc., Seattle, WA (US)

(72) Inventors: Mashhour Solh, San Jose, CA (US); Siyi Ding, Milipitas, CA (US); Rohith Mysore Vijaya Kumar, Sunnyvale, CA (US); Xiaoran Wang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/278,937

(22) Filed: Sep. 28, 2016

(51) Int. Cl.
*G07C 9/00* (2006.01)
*G06K 9/20* (2006.01)
*G06K 9/00* (2006.01)

(52) U.S. Cl.
CPC ..... *G07C 9/00158* (2013.01); *G06K 9/00255* (2013.01); *G06K 9/00288* (2013.01); *G06K 9/00771* (2013.01)

(58) Field of Classification Search
CPC .... G07C 9/00; G07C 9/0007; G07C 9/00071; G06K 9/00268; G06K 9/00288; G06K 9/00295; G06K 9/00302
USPC ........................................................ 382/118
See application file for complete search history.

(56) References Cited

U.S. PATENT DOCUMENTS

| | | | | |
|---|---|---|---|---|
| 9,640,055 B2 * | 5/2017 | Fadell | ................. | G08B 19/005 |
| 9,652,912 B2 * | 5/2017 | Fadell | ................ | G07C 9/00103 |
| 2007/0193834 A1 * | 8/2007 | Pai | ........................ | G06Q 10/08 186/3 |
| 2013/0024326 A1 * | 1/2013 | Dearing | ................ | G06Q 30/02 705/26.61 |
| 2014/0358703 A1 * | 12/2014 | Stuntebeck | .......... | G06Q 10/083 705/15 |
| 2015/0120596 A1 * | 4/2015 | Fadell | ................. | G08B 27/003 705/330 |
| 2015/0310381 A1 * | 10/2015 | Lyman | ................ | G06Q 10/083 705/330 |
| 2015/0371187 A1 * | 12/2015 | Irwin | ................ | G06Q 10/0836 705/72 |
| 2016/0307380 A1 * | 10/2016 | Ho | ..................... | G07C 9/00079 |
| 2017/0220872 A1 * | 8/2017 | Child | ................. | G06K 9/00771 |
| 2017/0228603 A1 * | 8/2017 | Johnson | ............ | G06K 9/00771 |

* cited by examiner

*Primary Examiner* — Iman K Kholdebarin
(74) *Attorney, Agent, or Firm* — Lee & Hayes, P.C.

(57) ABSTRACT

This application describes techniques for providing computer vision-based surveillance of in-home services. In some instances, a remote system may authenticate a guest at an environment using data that the remote system receives from a camera apparatus. To authenticate the guest, the remote system can determine that an identification of the guest matches an identification of a worker associated with a scheduled service at the environment. When the scheduled service includes an in-home delivery, the remote system can further determine that a package in possession of the guest matches an item for the scheduled in-home delivery. In some instances, after the guest enters the environment, the remote system can further monitor the environment to ensure that the guest stays within a designated location of the environment. The remote system can further send a message to an electronic device when the guest is outside of the designated location.

20 Claims, 10 Drawing Sheets

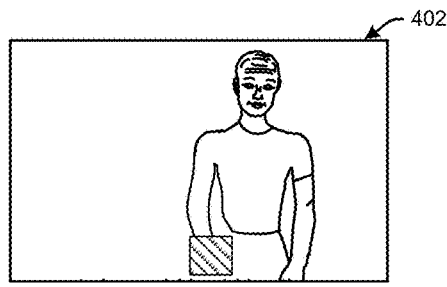
AUTHENTICATED
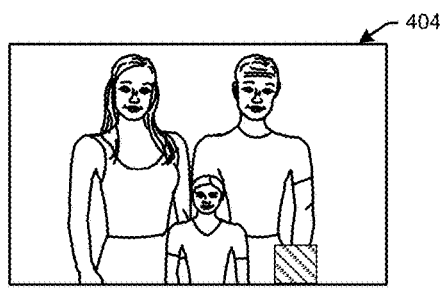 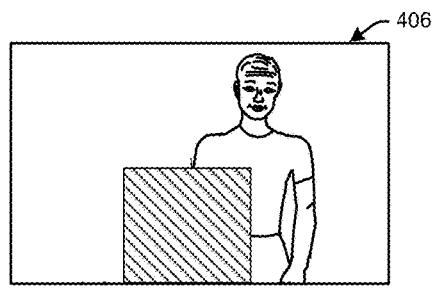
NOT AUTHENTICATED          NOT AUTHENTICATED
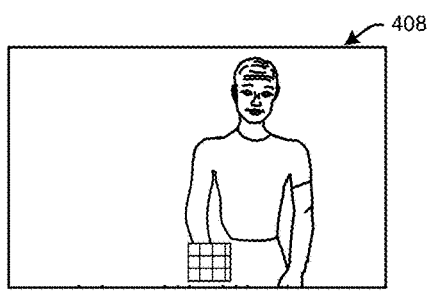 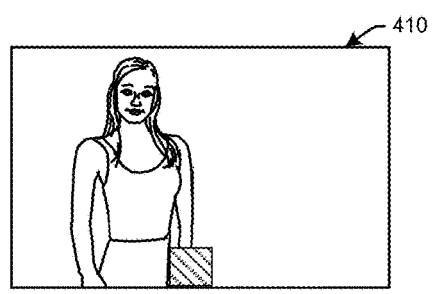
NOT AUTHENTICATED          NOT AUTHENTICATED
FIG. 4

COMPUTER VISION-BASED SURVEILLANCE FOR SERVICES

BACKGROUND

Homes are becoming connected. They now include computing devices, such as desktops, tablets, entertainment systems, portable communication devices, speech-enabled devices, camera-based devices, security devices, and the like. User interact with these computing devices in many ways, such as through mechanical devices (e.g., keyboards, mice, etc.), touch screens, motion, and gesture. In some instances, users may desire to use these computing devices in new ways. Provided herein are technical solutions to enable these and other types of devices to be used in new ways.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 illustrates examples of images that the remote system can use when authenticating objects at an environment.

DETAILED DESCRIPTION

Figure 1A:
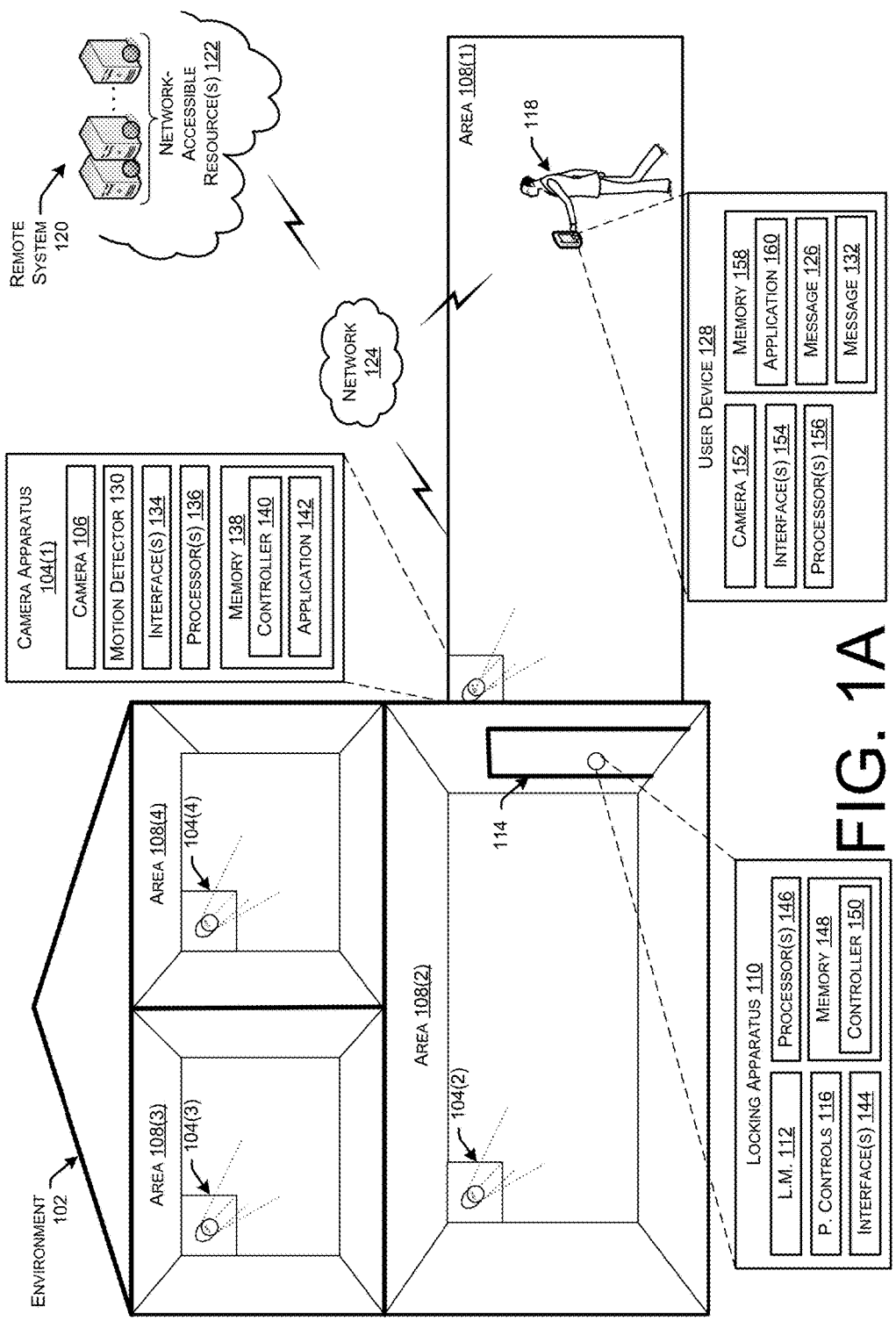
FIG. 1A is a first schematic diagram of a first example of performing a service at an environment. In the example of FIG. 1A, the environment that includes camera apparatuses configured to acquire image data (e.g., still image data, video data, etc.) representing both inner areas of the environment and outer areas of the environment, and a locking apparatus configured to secure an entrance to the inner portions environment. Each of the camera apparatuses and the locking apparatus include a respective network interface for communicating with other electronic devices, such as a remote system. In some instances, the remote system is configured to analyze the image data of the environment in order to authenticate an object that is at a location of the environment, such as a guest of the environment. Based on the authentication, the remote system is configured to provide the guest with access to the inner areas of environment using the locking apparatus.

Techniques for providing computer vision-based surveillance for manual services are described herein. As described above, homes, offices, and other environments often include an array of computing devices, including those that include cameras, such as security cameras, web cameras, and the like. The camera apparatuses described herein may include one or more network interfaces for sending image data, such as still image data and video data, of an environment, to a remote system. For instance, a camera apparatus may receive a message from the remote system that causes the camera apparatus to begin sending image data to the remote system. Based on receiving the message, the camera apparatus may capture image data representing an area of the environment in which the camera apparatus is located, and send the image data to the remote system.

The environment may further include one or more security locks configured to secure one or more entrances associated with the environment. For instance, the environment can include a locking apparatus on a main entrance (e.g., door, window, or other type of entrance) of the environment. In some instances, the locking apparatus can include a network interface for receiving messages from other electronic devices, such as the remote system, the camera apparatus, a user device associated with a user, a user device associated with a guest, or the like. The messages can cause the locking apparatus to move a locking mechanism from a locked position to an unlocked position and/or from an unlocked position to a locked position. In a locked position, the locking apparatus may cause the main entrance to be secure and inaccessible, such that a guest (e.g., a person or robot that can deliver a package) cannot enter secure areas of the environment. In an unlocked position, the locking apparatus may cause the main entrance to be unsecure and accessible, such that the guest can enter the secure areas the environment.

In some instances, a guest may attempt to perform an in-home service at the environment. An in-home service can include any type of activity that can be performed by a guest within the environment. For example, the guest can include delivery person and the in-home service can include an in-home delivery of a package. For another example, the guest can include a chef and the in-home service can include a catered meal cooked by the chef that is prepared within the environment. Still, for another example, the guest can include a house cleaner and the in-home service can include cleaning one or more areas within the environment.

Additionally, in some instances, the guest may include a robot that performs the in-home service within the environment. For instance, the guest can include any type of mechanical agent, such as an electromechanical machine, that is guided by a computer program and/or electronic circuitry to perform the in-home service. In some instances, the robot can include an autonomous robot while in some instances, the robot can include a semi-autonomous robot (e.g., a robot controlled remotely by a human user). For instance, the robot can include a flying robot, such as a drone, that delivers packages to the environment. In some instances, the robot can deliver the packages to an inner portion of the environment while in some instances, the robot can deliver the packages to an outer portion of the environment (e.g., a yard, front porch, etc.).

Upon arrival of the guest at the environment, the remote system can receive a message indicating that the guest is at the environment. In some instances, the remote system may receive the message from a camera apparatus that detects the guest at the environment. In some instances, the remote system may receive the message from a device associated with a profile of the guest. Additionally or alternatively, in some instances, the remote system can receive the message from a third-party service. For instance, the guest may work for a company associated with the in-home service. Upon arrival of the guest at the environment, the third-party service can send the remote system the message indicating that the guest has arrived at the environment.

Based on receiving the message, the remote system then provides the guest with access to the secure areas of the environment (e.g., areas within a structure, such as a home, office, etc., that is associated with the environment). In some instances, to provide the guest with access to the secure areas of the environment, the remote system may send a message to the camera apparatus that causes the camera apparatus to provide the guest with access to the secure areas. In such instances, the camera apparatus can receive the message, and then send an additional message (and/or relay the message) to the locking apparatus that causes the locking apparatus to unlock the entrance of the environment. In some instances, the remote system may send a message to the locking apparatus that causes the locking apparatus to unlock the entrance of the environment. Still, in some instances, the remote system may send the message to a lock control apparatus, such as an electronic device within the secure areas of the environment (e.g., another camera apparatus). In such instances, the lock control apparatus can receive the message, and then send an additional message (and/or relay the message) to the locking apparatus that causes the locking apparatus to unlock the entrance of the environment.

After unlocking the entrance for the guest, the guest can enter the secure areas of the environment through the entrance and perform the service within the environment. In some instances, the remote system secures areas within the environment, such as one or more rooms, while the guest is performing the service. For instance, the remote system can determine one or more designated zones (described below) for the guest within the environment. Based on the designated zones, the remote system can cause one or more areas within the environment, which are not designated for the guest, to be secure. For instance, the remote system can cause a locking apparatus associated with the one or more areas to secure the areas (e.g., cause the locking apparatuses to lock doors associated with the area). The remote system can then provide access to the one or more areas when the guest is finished performing the service, using a similar method as above for the entrance.

In some instances, one or more camera apparatuses within the environment capture image data representing the environment while the guest is within the environment. The one or more camera apparatuses then send the image data to the remote system for monitoring the environment. While the guest is performing the service and/or when the guest is finished performing the in-home service and exits the environment, the locking apparatus can return to a locked state in order to secure the environment.

In some instances, before the remote system sends the message to the camera apparatus, the remote system first authenticates an object (e.g., a person, robot, etc.) at the environment to ensure that the object corresponds to the guest. To authenticate the object, the remote system can store data associated with one or more scheduled services at the location corresponding to the environment. Data associated with a scheduled service can include at least the location of the environment, a time scheduled for the service, an identity of the user, an identity of the guest, information associated with performing the service, zones (e.g., areas, rooms, locations, etc.) within the environment in which the guest is authorized (e.g., designated zones), or the like. For instance, for a scheduled delivery, the data can include at least the delivery location, the delivery time, an identity of the user, an identity of the guest (e.g., the delivery person, the robot, etc.), identities of items being delivered at the delivery location, characteristics (e.g., size, weight, color, etc.) for each item being delivered, characteristics (e.g., size, weight, color, etc.) of packages being used to deliver the items, or the like. As used herein, items can include clothing, electronic devices, food, tools, or any other tangible item that can be delivered to an environment.

In some instances, the remote system can further store profiles associated with guests and/or a profile associated with the user. A profile associated with a guest can include data indicating an identifier for the guest (e.g., name, identification number, serial number or other "robot" identifier, model number, etc.), services that the guest performs, physical characteristics of the guest (e.g., height, weight, color, model, etc.), contact information for the guest (e.g., phone number, email address, etc.) or the like. The profile can further be associated with image data corresponding to one or more images representing the guest, facial recognition data created from the one or more images that identifies features of a face of the guest (e.g., relative position, size, and/or shape of the guest's eyes, nose, cheekbones, jaw, etc.), and/or voice data representing a voice of the guest. A profile associated with the user can include data indicating an identity of the user, contact information for the user, one or more environments associated with the user, designated zones for each environment, a purchase history associated with the user (e.g., one or more services ordered by the user, such as through an online marketplace), or the like.

In some instances, the remote system can use the stored data to authenticate an object at the location corresponding to the environment. For instance, the remote system can receive a message indicating that the object is at the location. As discussed above, in some instances, the remote system receives the message from a device associated with a profile of the guest or from the object (if it is a robotic device) when the object arrives at the location. In some instances, the remote system receives the message from another device (e.g., the camera apparatus) when the other device detects the object at the location. Based on receiving the message, the remote system may send a request to the camera apparatus for image data representing the environment. In some instances, the image data can include still image data and video data, representing the environment. In such instances, the remote system processes the image data (using a similar process as described below for the camera apparatus) after receiving the image data from the camera apparatus. Additionally or alternatively, in some instances, the data can include image data that the camera apparatus processes before sending to the remote system.

For instance, the camera apparatus can capture image data representing an area of the environment. The camera apparatus can then process the image data using one or more image processing techniques in order to detect one or more features within the image data and/or a portion of the image data. In some instances, the one or more features can include a number of objects at the location, an image of each object at the location, an identification of a uniform worn by each object at the location, or the like. In some instances, when the scheduled service includes a scheduled delivery, the one or more features can further include a number of packages (e.g., boxes) at the location, a size of each of the packages, an identifier on each of the packages, a color of each of the packages, or the like. The camera apparatus can then send the processed image data to the remote system for authentication.

Using the processed image data, the remote system can authenticate the object at the location. For instance, the remote system can analyze the data associated with the one or more scheduled services at the environment to determine whether a service is scheduled at a time that the object arrives at the environment. In some instances, the remote system can determine a date and/or time corresponding to when the remote system received the image data. Using the data and/or time, the remote system can search the data to determine if a service is scheduled at the environment at the date and/or time.

If a service is scheduled at the time, the remote system can then determine whether the object at the environment corresponds to the guest associated with the scheduled service. In some instances, the remote system determines whether the object corresponds to the guest using one or more computer vision algorithms, such as those trained for facial recognition. Facial recognition can include principal component analysis, linear discriminant analysis, elastic bunch graph matching, multilinear subspace learning, dynamic link matching, 3-dimensional recognition, and/or the like.

For instance, the remote system can analyze the processed image data representing the area of the environment with respect to the image data corresponding to the one or more images depicting the guest and/or with respect to the facial recognition data associated with the guest. Analyzing the processed image data can include analyzing features associated with the face of the object represented in the processed image data with respect to features associated with the facial recognition data and/or with respect to features associated with the face of the guest as represented in the stored image data for the guest. In some instances, the remote system first defines a portion of the processed image data that represents the object (e.g., pixel data representing a face of the object), and then performs the analysis using the portion of the processed image data. For instance, the remote system can analyze features of the portion with respect to features of the images depicting the guest and/or with respect to the facial recognition data in order to determine whether the object is the guest.

Additionally or alternatively, in some instances, the remote system can determine whether the object corresponds to the guest based on an identifier (e.g., a nametag, an identification card, model number, serial number, etc.) that the remote system identifies within the processed image data. For instance, the remote system can utilize one or more algorithms associated with object recognition and/or optical character recognition to identify the identifier from the processed image data. The remote system can then analyze the identifier with respect to the profile of the guest to determine if the identifier is associated with the guest. For instance, the remote system can determine whether the identifier identified within the processed image data is associated with the profile of the guest. Based on the identifier being associated with the profile of the guest, the remote system can determine that the object corresponds to the guest.

Additionally or alternatively, the remote system can determine whether the object corresponds to the guest using one or more trained algorithms associated with voice recognition. For instance, the remote system can receive an audio signal from the camera apparatus and/or the device associated with the profile of the guest, where the audio signal represents user speech from the object. The remote system can then utilize voice recognition to analyze the audio signal with respect to the audio data that is stored in association with the profile of the guest to determine whether the object corresponds to the guest.

In some instances, when the scheduled service includes a scheduled delivery at the environment, the remote system can use additional techniques for authenticating the object. For instance, the remote system can identify at least one item being delivered at the environment using the data associated with the scheduled delivery. The remote system can then authenticate that one or more packages in possession of the object correspond to the at least one item.

In some instances, the remote system can store image data representing the at least one item and/or the one or more packages that are used for delivering the at least one item in association with the scheduled service. In some instances, the remote system can further store item recognition data representing features (e.g., size, shape, color, texture, etc.) of the at least one item and/or the one or more packages. The remote system can then utilize one or more trained algorithms associated with one or more object recognition techniques to analyze the processed image data (and/or a portion of the processed image data) received from the camera apparatus in order to determine whether the image data (and/or a portion of the image data) represents at least one item and/or at least one package. In some instances, the one or more object recognition techniques can include edge matching, divide-and-conquer search, greyscale matching, gradient matching, interpretation trees, hypothesize and test, or the like.

In some instances, based on determining that the image data represents the at least one item and/or at least one package, the remote system can determine that the at least one item and/or that the at least one package is at the environment. In some instances, the remote system can further determine that the object is in possession of the at least one item and/or at least one package. For instance, based on the analysis, the remote system may determine an item in possession of the object corresponds to the at least one item and/or that a package in possession of the object corresponds to a package used to deliver the at least one item. Based on the determination, the remote system can determine that the object is in possession of the at least one item.

Additionally or alternatively, the remote system can determine that the one or more packages corresponds to the at least one item based on characteristics of each of the one or more packages, such as size, color, an identifier, or the like. For instance, as discussed above, the remote system can use one or more image processing techniques to determine a number of packages at the location, a size of each of the packages, an identifier on each of the packages, a color of each of the packages, or the like. In some instances, the one or more image processing techniques first define a portion of the image data that substantially represents each of the one or more packages (e.g., pixel data representing each of the one or more packages). The one or more image processing techniques then analyze pixel data to determine the characteristics associated with the one or more packages.

In some instances, the remote system then matches the one or more packages with the at least one item using both the characteristics and the stored data for the scheduled service. For instance, the remote system can determine that an identifier on each of the package (e.g., name, serial number, etc.) corresponds to the identity of the at least one item. In some instances, the remote system can determine that a size of each of the package corresponds to a particular size of the at least one item. For instance, in some examples, for an item, the remote system can determine that a size of a package is large enough to fit the item. Still, in some instances, when more than one item is scheduled for delivery, the remote system can determine that a number of packages at the delivery location matches the number of packages used to package the multiple items.

Additionally to authenticating the one or more packages, the remote system can determine whether a correct number of objects are at the delivery location performing the in-home delivery. For instance, based on a size and/or type of an item, the remote system can determine whether a number of objects at the environment is appropriate for performing the in-home delivery. For example, if the delivery item includes a mattress, the remote system can determine that it is proper that between two and three objects are at the delivery location to perform the in-home delivery. For another example, if the delivery item includes a phone, the remote system can determine that it is not proper for two objects to be at the delivery location performing the in-home delivery.

In some instances, after authenticating that the object corresponds to the guest, the remote system can then send the device associated with the profile of the guest a message indicating one or more designated zones within the environment for performing the service. For instance, the remote system can identify the type of service being performed within the environment. Based on the type of service, the remote system can send the device a message indicating one or more zones (e.g., rooms, areas, locations etc.) within the environment in which the guest is authorized to occupy. For instance, if the guest includes a chef, the remote system can send the device of the guest a message indicating that the chef is allowed within the kitchen, but not allowed in any other area of the environment (e.g., bedrooms). In some instances, the message can further include a floor layout of the environment that indicates the one or more designated zones.

For instance, the remote system can use the data associated with the scheduled service to determine a type of guest that is performing the service. For instance, if the data indicates that the scheduled service includes a catered dinner, the remote system may determine, or the data may further indicate, that the guest includes a chef. Based on determining the type of guest, the remote system can then determine areas within the environment that the guest needs access to when performing the service. For instance, the remote system can determine that the chef needs access to the kitchen, as well as any area between an entrance and the kitchen, to perform the service. The remote system can then send the device designation locations based on the determination.

In some instances, when the scheduled service includes a scheduled delivery, the message can include a specific zone for performing the in-home delivery. For instance, the remote system can use an identity of an item to determine a specific zone within the environment for performing the in-home delivery. The remote system can send the device of the delivery person a message that specifies the specific zone in which the package should be left within the environment. In some instances, the message further includes a floor layout of the environment that indicates a route to take from the entrance to the specific zone.

In some instances, in addition to or alternatively from determining the one or more designated zones and/or the specific zone, the remote system can receive information that designates the one or more designated zones and/or the specific zone. For instance, at a time of scheduling a service, the user can use a user device to send a message to the remote system. The message can include a designation of one or more zones within the environment in which the guest are authorized to occupy and/or one or more zones within the environment in which the guest is not authorized to occupy. Additionally or alternatively, when the scheduled service includes a scheduled delivery, the message can indicate specific zones within the environment for performing the in-home delivery.

In some instances, the remote system can further use one or more camera apparatuses to monitor the guest while the guest is within the environment performing the service. For instance, the remote system can receive data from a camera apparatus located within the environment. In some instances, the data can include image data, such as still image data and video data, representing various areas within the environment. In such instances, the remote system processes the image data (using a similar process as described below for the camera apparatus) after receiving the image data from the camera apparatus. Additionally or alternatively, in some instances, the data can include image data that the camera apparatus processes before sending to the remote system. For instance, the camera apparatus can capture image data within the environment, and then process the image data in order to determine a position of the guest within the environment.

Using the image data from the camera apparatus, the remote system can determine whether the guest is within the one or more designated zones. As discussed above, a designated zone for the guest corresponds to an area within the environment in which the guest is authorized to be located. In some instances, based on the guest being located within the one or more designated zones, the remote system can continue to receive data from the one or more camera apparatus and monitor the data to determine whether the guest's position remains within the one or more designated zones. In some instances, based on the guest being located outside of the one or more designated zones, the remote system can send a message to the user device of the user that alerts the user that the guest is outside of the one or more designated zones.

For example, a scheduled service can include a scheduled delivery of groceries. Based on the type of items, e.g., the groceries, the remote system can determine that one or more designated zones for the delivery person (e.g., the guest) include the kitchen of the environment, as well as any adjoining areas within the environment that the delivery person is required to walk through to get the kitchen. Using the one or designated zones, the remote system can receive first image data from a first camera apparatus. The remote system can then use the first image data determine a position of the delivery person within the environment. Based on the delivery person being located within the one or more designated zones, such as the kitchen, the remote system can continue to monitor the environment during the in-home delivery.

Later, the remote system can receive second image data from the first camera apparatus and/or a second camera apparatus located within the environment. Using the second image data, the remote system can determine that the delivery person is no longer within the one or more designated zones for the in-home delivery. For instance, the remote system can determine that a position of the delivery person is located within a bedroom of the environment. Based on the determination, the remote system can send a message to the user device associated with the profile of the user that indicates that the delivery person is no longer within the one or designated zones. Additionally, in some instances, the remote system can further send a message to the device associated with the profile of the delivery person that indicates that the delivery person is no longer within the one or more designated zones.

In some instances, to determine the position of the guest within the environment, the remote system can use location data associated with each of the camera apparatus. For instance, the remote system can receive location data for a camera apparatus that indicates an area (e.g., bedroom, kitchen, living room, etc.) of the environment that camera is located. Based on the location data, the remote system can determine that image data received from the camera apparatus represents at least a portion of the area. The remote system can then use that determination to determine the position of the guest. For instance, the remote system can analyze the image data received from the camera apparatus (using the techniques described above) to determine that the image data (and/or a portion of the image data) represents the guest. Based on the image data representing the guest, the remote system can determine that the guest is within the area.

In some instances, in addition to, or alternatively from, using the location data, the remote system can analyze image data received from a camera apparatus to determine the area of the environment that the camera apparatus is located within. For instance, the remote system can use the image processing techniques described above to analyze image data received from a camera apparatus in order to identity items, such as furniture, represented by the image data (and/or a portion of the image data). Based on a type of items, the remote system can determine the area. For instance, based on the items including bedroom furniture, such as a bed and dresser, the remote system can determine that the area corresponds to a bedroom.

It should be noted that, in some examples, in addition to, or alternatively from, the remote system authenticating guests and/or monitoring the environment, one or more camera apparatuses within the environment may authenticate guests and/or monitor the environment. For instance, the camera apparatus that captures image data of the one or more guests that arrive at the environment can authenticate the one or more guests using a similar technique as the remote system above. In some instances, to authenticate the one or more guests, the camera apparatus can receive the data associated with the one or more scheduled services, the data associated with the guests, and/or the data associated with the user. For instance, the camera apparatus can receive all and/or some of the data from the remote system.

Additionally, in some instances, one or more camera apparatuses within the environment can monitor the one or more guests while the one or more guests are within the environment performing the in-home service. For instance, a camera apparatus located within the environment can capture image data associated with the environment and use the image data to monitor the one or more guests using a similar process as described above for the remote system. In some instances, to monitor the one or more guests, the camera apparatus can receive data from the remote system indicating the one or more designated zones within the environment. In some instances, to monitor the one or more guests, the camera apparatus can determine the one or more designated zones using data received from the remote system. For instance, the camera apparatus can determine the one or more designated zones based on type of service being performed within the environment.

It should further be noted that, even though the description above describes a physical entrance, such as a door, for providing access to a guest, in some instances, the entrance can include a different type of barrier. For instance, an electronic device within the environment, such as the lock control apparatus or a camera apparatus, may create a virtual barrier that blocks the guest from entering one or more secure areas of the environment. In some instances, to secure the virtual barrier, the remote system can send a message to an electronic device of the user, or cause an alarm to sound, when the virtual barrier is breached by the guest. As such, based on authenticating the guest, the remote system can send a message to the electronic device that causes the electronic device to remove the virtual barrier. By removing the virtual barrier, the guest can then access the secure areas of the environment to perform a service. Additionally, once the guest is finished performing the service, the remote system can send a message to the electronic device causing the electronic device to again create the virtual barrier.

Additionally, in some instances, the remote system may secure the secure areas of the environment during a service. For instance, the remote system may determine that the guest does not need to access the secure areas of the environment while performing the service. For instance, the guest may be performing a delivery that is to occur outside of the secure areas of the environment, such as on a porch, or in the yard, of the environment. Based on such a determination, the remote system may cause the entrance of the environment to be secure, such that the guest cannot enter the secure areas. In some instances, the remote system can cause the entrance to be secure based on receiving the message indicating that the guest is at the environment. In some instance, the remote system may cause the entrance to be secure based on a designated time period around when the service is to be performed at the environment.

Furthermore, in some instances, along with providing the guest access to the secure areas of the environment, the remote system may further secure other areas within the environment that are not designated for the guest. For instance, the remote system may lock one or more doors (using a similar process as described above for the entrance) within the environment based on providing the guest access to the environment. By locking the doors, the remote system is limiting which of the secure areas within the environment the guest is able to access. In some instances, based on the guest finishing the service, such as by leaving the environment, the remote system can then provide access to the areas.

As described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

Additionally, as discussed above, image data can include still image data and video data. Still image data can represent images captured within an environment that the remote system receives from a camera apparatus at given time intervals. Video data can represent a video captured within the environment that the remote system receives from a camera apparatus. For instance, formats for image data can include Joint Photographic Expert Group (JPEG), Exchangeable Image File Format (Exif), Tagged Image File Format (TIFF), Graphics Interchange Format (GIF), Portable Network Graphics (PNG), Better Portable Graphics (BPG) or any other type of image data format that electronic devices can send and receive with one another.

As described herein, in some instances, the remote system can determine that the guest is at the environment and/or a location of the guest within the environment based on determining that the image data (and/or a portion of the image data) received from the camera apparatus represents the guest (using the facial recognition techniques described above). Additionally, in some instances, the remote system can determine that the item is at the environment and/or that the guest is in possession of the item based on determining that the image data (and/or a portion of the image data) represents the item (using the object recognition techniques described herein).

For instance, the remote system can receive image data from a camera apparatus, where the image data represents an area within the environment in which the camera apparatus is acquiring the image data. The remote system can then analyze the image data (and/or a portion of the image data) using one or more facial recognition techniques in order to determine whether the image data (and/or a portion of the image data) further represents the guest. Based on determining that the image data (and/or a portion of the image data) does not further represent the guest, the remote system can determine that the position of the guest is not within the area. However, based on determining that the image data (and/or a portion of the image data) further represents the guest, the remote system can determine that the position of the guest is within the area.

Additionally, the remote system can analyze the image data (and/or a portion of the image data) using one or more object recognition techniques in order to determine whether the image data (and/or a portion of the image data) further represents an item and/or package. Based on determining that the image data (and/or a portion of the image data) does not further represent the item and/or package, the remote system can determine that the position of the item and/or package is not within the area. However, based on determining that the image data (and/or a portion of the image data) further represents the item and/or package, the remote system can determine that the position of the item and/or package is within the area and/or that the guest is in possession of the item and/or package.

FIG. 1A is a first schematic diagram of a first example of performing a service at an environment 102. In the example of FIG. 1A, the environment 102 includes one or more camera apparatuses 104(1)-(4) that each include a camera 106 (although FIGS. 1A-1C only illustrate details of camera apparatus 104(1) for clarity purposes) configured to acquire image data (e.g., still image data, video data, etc.) of different respective areas 108(1)-(4) (e.g., rooms, zones, portions of the environment, etc.) associated with the environment 102. For instance, the camera apparatus 104(1) is configured to acquire image data from the first area 108(1) associated with an outside of the environment 102, the second camera apparatus 104(2) is configured to acquire image data from the second area 108(2) within the environment 102, the third camera apparatus 104(3) is configured to acquire image data from the third area 108(3) within the environment 102, the fourth camera apparatus 104(4) is configured to acquire image data from the fourth area 108(4) within the environment 102. As described herein the first area 108(1) includes an unsecure area, while the other areas 108(2)-(4) include secure areas of the environment 102.

Environment 102 further includes a locking apparatus 110 that includes a locking mechanism 112 configured to secure the main entrance 114 of the environment 102. In addition, the locking apparatus 110 further includes physical controls 116 that are configured to cause the locking apparatus 110 to move the locking mechanism from a locked position to an unlocked position and/or from an unlocked position to a locked position. In a locked position, the locking apparatus 110 causes the main entrance 114 to be secure and inaccessible, such that an object 118 (e.g., a guest as described in FIGS. 11B and 11C, which take place after authentication) cannot enter the secure areas 108(2)-(4) of the environment 102 to perform an in-home service. In an unlocked position, the locking apparatus 110 causes the main entrance to be unsecure and accessible, such that the guest 118 can enter the secure areas 108(2)-(4) of the environment 102 to perform in-home service.

In some instances, a remote system 120 associated with network accessible resource(s) 122 is configured to send messages to the camera apparatuses 104(1)-(4) that request the camera apparatuses 104(1)-(4) to send acquired data to the remote system 120 via a network connection 124. For instance, the remote system 120 can determine that the object 118 is at the first area 108(1) associated with the environment 102. In some instances, the remote system 120 determines that the object 118 is at the first area 108(1) by receiving a message 126 from a user device 128 associated with a profile of a guest, wherein the message indicates that the device 128 is at the environment 102. Additionally or alternatively, in some instances, the remote system 120 determines that the object 118 is at the first area 108(1) by receiving a message from the first camera apparatus 104(1) that indicates that the object 118 is at the environment 102. For instance, the first camera apparatus 104(1) can detect the object 118 using the camera 106 and/or a motion detector 130. Based on detecting the object 118, the first camera apparatus 104(1) can send the message to the remote system 120.

After detecting the object 118 at the environment 102, the remote system 120 can send a message to the first camera apparatus 104(1) that requests the first camera apparatus 104(1) to send acquired data to the remote system. In some instances, the data can include image data, such as still image data and video data, representing the first area 108(1). In such instances, the remote systems 120 processes the image data (using a similar process as described below for the first camera apparatus 104(1)) after receiving the image data from the first camera apparatus 104(1). Additionally or alternatively, in some instances, the data can include image data that the first camera apparatus 104(1) processes before sending to the remote system 120.

For instance, the first camera apparatus 104(1) can capture image data representing the first area 108(1) associated with the environment 102. The first camera apparatus 104(1) can then process the image data using one or more image processing techniques in order to detect one or more features within the image data. In some instances, the features can include a number of objects at the first area 108(1), an image of each object at the first area 108(1), an identification of a uniform worn by each object at the first area 108(1), or the like. In some instances, when the scheduled service includes a scheduled delivery, the features can further include a number of boxes (e.g., packages) at the first area 108(1), a size of each of the boxes, an identifier on each of the boxes, a color of each of the boxes, or the like. The first camera apparatus 104(1) can then send the processed image data to the remote system 120 for authentication.

Using the processed image data, the remote system 120 can authenticate the object 118 at the first area 108(1). For instance, the remote system 120 can analyze data associated with one or more scheduled services to determine whether a service is scheduled around a time that the object 118 arrives at the first area 108(1). Additionally or alternatively, in some instances, the remote system 120 can determine whether an identity of a guest associated with the scheduled service matches an identity of the object 118 at the first area 108(1). In some instances, the remote system 120 determines whether the identity of the guest from the scheduled service matches the object 118 at the first area 108(1) using one or more trained algorithms associated with facial recognition. Additionally or alternatively, in some instances, the remote system 120 can determine whether the identity of the guest from the scheduled service matches the identity of the object 118 at the first area 108(1) based on an identifier (e.g., a nametag, an identification card, etc.) that the remote system 120 identifies within the processed image data.

In some instances, when the scheduled service includes a scheduled delivery at the environment 102, the remote system 120 can use additional techniques for authenticating the object 118. For instance, the remote system 120 can identify at least one item being delivered at the environment 102 using data associated with the scheduled delivery. In some instances, the remote system 120 stores the data associated with the scheduled delivery locally in a database. The remote system can then determine that the image data and/or a portion of the image data represents one or more packages (using the object recognition techniques described herein). Based on the determination, the remote system can determine that one or more packages are at the environment and/or that the object 118 is in possession of the one or more packages. The remote system 120 can then authenticate that one or more packages in possession of the object 118 (e.g., a delivery person) correspond to the at least one item.

For instance, the remote system 120 can determine that a package corresponds to the at least one item by matching the package with the at least one item. In some instances, to match the package with the at least one item, the remote system 120 can determine that a color of the package corresponds to colors of packages that are used for the at least one item. In some instances, the remote system 120 can determine that an identifier on the package (e.g., name, serial number, etc.) corresponds to the identity of the at least one item. In some instances, the remote system 120 can determine that a size of the package corresponds to packages that are used for the at least one item. Still, in some instances, when more than one item is scheduled for delivery, the remote system 120 can determine that a number of packages at the first area 108(1) matches the number of packages used to package the multiple items.

In some instances, in addition to authenticating the one or more packages, the remote system 120 can determine whether a correct number of objects are at the first area 108(1) to perform the in-home delivery. For instance, based on a size and/or type of an item, the remote system 120 can determine whether a number of objects at the first area 108(1) is appropriate for performing the in-home delivery. For example, if the delivery item is for a mattress, the remote system 120 can determine that it is proper that between two and three objects are at the first area 108(1) to perform the in-home delivery. For another example, if the delivery item is for a phone, the remote system 120 can determine that it is not proper for two objects to be at the first area 108(1) to perform the in-home delivery.

After authenticating that the object 118 corresponds to the guest associated with the scheduled service, the remote system 120 can send a message that causes the locking apparatus 110 to provide the guest 118 (now labeled guest 118 since the guest 118 has been authorized) access to the secure areas 108(2)-(4) of the environment 102. In some instances, the remote system 120 may send the message to a lock control apparatus (e.g., one or more of the one of the camera apparatuses 104(1)-(4), a separate electronic device (not shown) etc.). Based on receiving the message from the remote system 120, the lock control apparatus can send an additional message (and/or relay the message) to the locking apparatus 110 that causes the locking apparatus 110 to unlock the entrance 114 of the environment 102. Additionally or alternatively, in some instances, the remote system 120 may send a message to the locking apparatus 110 that causes the locking apparatus 110 to unlock the entrance 114 of the environment 102.

In some instances, in addition to providing the guest 118 access to the secure areas 108(2)-(4) of the environment 102, the remote system 120 can send the user device 128 a message 132 indicating one or more designated zones within the environment 102 for performing the service. For instance, the remote system 120 can identify the type of service being performed within the environment 102. Based on the type of service, the remote system 120 can send the user device 128 the message 132 indicating one or more zones within the environment 102 in which the guest 118 can occupy. For instance, if the guest 118 includes a chef, the message 132 can indicate that the chef is allowed within the kitchen, but not allowed in any other area of the environment 102 (e.g., a bedroom). In some instances, the message 132 can further include a floor layout of the environment 102 that includes indicates the one or more designated zones.

In some instances, based on the scheduled service including a scheduled delivery, the message 132 can further include a specific zone within the environment 102 for performing the in-home delivery. For instance, the remote system 120 can use an identity of an item being delivered to the environment 102 to determine a specific zone within the environment 102 for performing the in-home delivery. The remote system 120 can send the user device 128 a message 132 that specifies specific zone in which the package should be placed within the environment 102. In some instances, the message 132 further includes a floor layout of the environment 102 that indicates a route to take from the entrance 114 to the specific zone.

In some instances, in addition to or alternatively from determining the one or more designated zones and/or the specific zone, the remote system 120 can receive information that designates the one or more designated zones and/or the specific zone. For instance, at a time of scheduling a service, the user can use a user device (illustrated in FIG. 1C) to send a message to the remote system 120. The message can include a designation of one or more zones within the environment 102 in which the guest 118 can occupy and/or one or more zones within the environment 102 in which the guest 118 cannot occupy. Additionally or alternatively, when the scheduled service includes a scheduled delivery, the message can indicate a specific zone within the environment 102 for performing the in-home delivery.

As illustrated in FIG. 1, the first camera apparatus 104(1) (and similarly the camera apparatuses 104(2)-(4)) further include network interface(s) 134, processor(s) 136, and memory 138, which stores a controller 140 and an application 142. The controller 140 is configured to cause the first camera apparatus 104(1) to start receiving image data (e.g., activate) and/or stop receiving image data (e.g., deactivate). Additionally, the controller 140 is further configured to cause the first camera apparatus 104(1) to send image data to the remote system 120 and/or stop sending image data to the remote system 120. For instance, the controller 140 can cause the first camera apparatus 104(1) to both activate and send image data to the remote system 120 based on receiving a message from the remote system 120.

The application 142 is configured to process image data that is acquired by the first camera apparatus 104(1). For instance, the application 142 can use one or more image processing techniques to identify features within image data. In some instances, the features can include a number of guests at the first area 108(1), a position for each of the guests, an identity of each of the guests, a number of packages at the first area 108(1), a size of each of the packages, a color of each of the packages, an identifier for each of the packages, or the like.

The locking apparatus 110 further includes network interface(s) 144, processor(s) 146, and memory 148, which stores controller 150. The controller 150 is configured to cause the locking mechanism 112 to move from a locked position to an unlocked position and/or from the unlocked position to the locked position. For instance, the controller 150 can cause the locking mechanism 112 to move from a locked position to an unlocked position based on the locking apparatus 110 receiving a message from an electronic device, such as a lock control apparatus (e.g., one or more of the camera apparatus 104(1)-(4)), the remote system 120, the user device 128, or the like. The controller 150 can further cause the locking mechanism 112 to move from the unlocked position to the locked position based on receiving an additional message from an electronic device.

Also illustrated in FIG. 1A, the user device 128 further includes a camera 152, network interface(s) 154, processor(s) 156, and memory 158, which stores application 160, the message 126, and the message 132. In some instances, the user device 128 can use the application 160 to send and receive messages (e.g., the message 126, the message 132, etc.) with the remote system 120, the camera apparatuses 104(1)-(4) and/or the locking apparatus 110. Additionally, the user device 128 can use the camera 152 to send image data to other electronic devices, such as the remote system 120. For instance, the user device 128 can use the camera 152 to acquire a picture of the guest 118. In some instances, the user device 128 can then send the image data to the remote system 120 in order to authenticate that the guest 118 is at the first area 108(1) associated with the environment 102.

As used herein, a processor (e.g., processor(s) 136, processor(s) 146, processor(s) 156, etc.) may include multiple processors and/or a processor having multiple cores. Further, the processors may comprise one or more cores of different types. For example, the processors may include application processor units, graphic processing units, and so forth. In one implementation, the processor may comprise a microcontroller.

Memory (e.g., memory 138, memory 148, memory 158, etc.), may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional modules are shown stored in the respective memories, the same functionality may alternatively be implemented in hardware, firmware, application specific integrated circuits, field programmable gate arrays, or as a system on a chip (SoC). In addition, while not illustrated, each respective memory discussed herein may include at least one operating system (OS) module that is configured to manage hardware resource devices such as the network interface(s), the I/O devices of the respective apparatuses, and so forth, and provide various services to applications or modules executing on the processors. Such OS module may implement a variant of the FreeBSD operating system as promulgated by the FreeBSD Project; other UNIX or UNIX-like variants; a variation of the Linux operating system as promulgated by Linus Torvalds; the Fire OS operating system from Amazon Technologies, Inc. of Seattle, Wash. USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s) (e.g., network interface(s) 134, network interface(s) 144, network interface(s) 154, and other network interface(s) described herein) may enable communications between electronic devices. Such network interface(s) can include one or more network interface controllers (NICs) or other types of transceiver devices to send and receive communications over a network. For instance, network interface(s) can include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, network interface(s) may include a wide area network (WAN) component to enable communication over a wide area network.

The network 124 may represent an array or wired networks, wireless networks (e.g., WiFi), or combinations thereof. The remote system 120 may generally refer to a network-accessible platform—or "cloud-based service"—implemented as a computing infrastructure of processors, storage, software, data access, and so forth that is maintained and accessible via the network 124, such as the Internet. As such, the remote system may comprise one or more devices, which collectively may comprise a remote device. Cloud-based services may not require end-user knowledge of the physical location and configuration of the system that delivers the services. Common expressions associated with cloud-based services, such as the remote system 120, include "on-demand computing", "software as a service (SaaS)", "platform computing", "network accessible platform", and so forth.

In some instances, the remote system 120 may be local to the environment 102. For instance, the remote system 120 can be located within the environment 102. In some instances, some or all of the functionality of the remote system 120 may be performed by one of the camera apparatuses 104(1)-(4). For instance, the first camera apparatus 104(1) may authenticate the guest 118 when the guest 118 arrives at the first area 108(1).

Figure 1B:
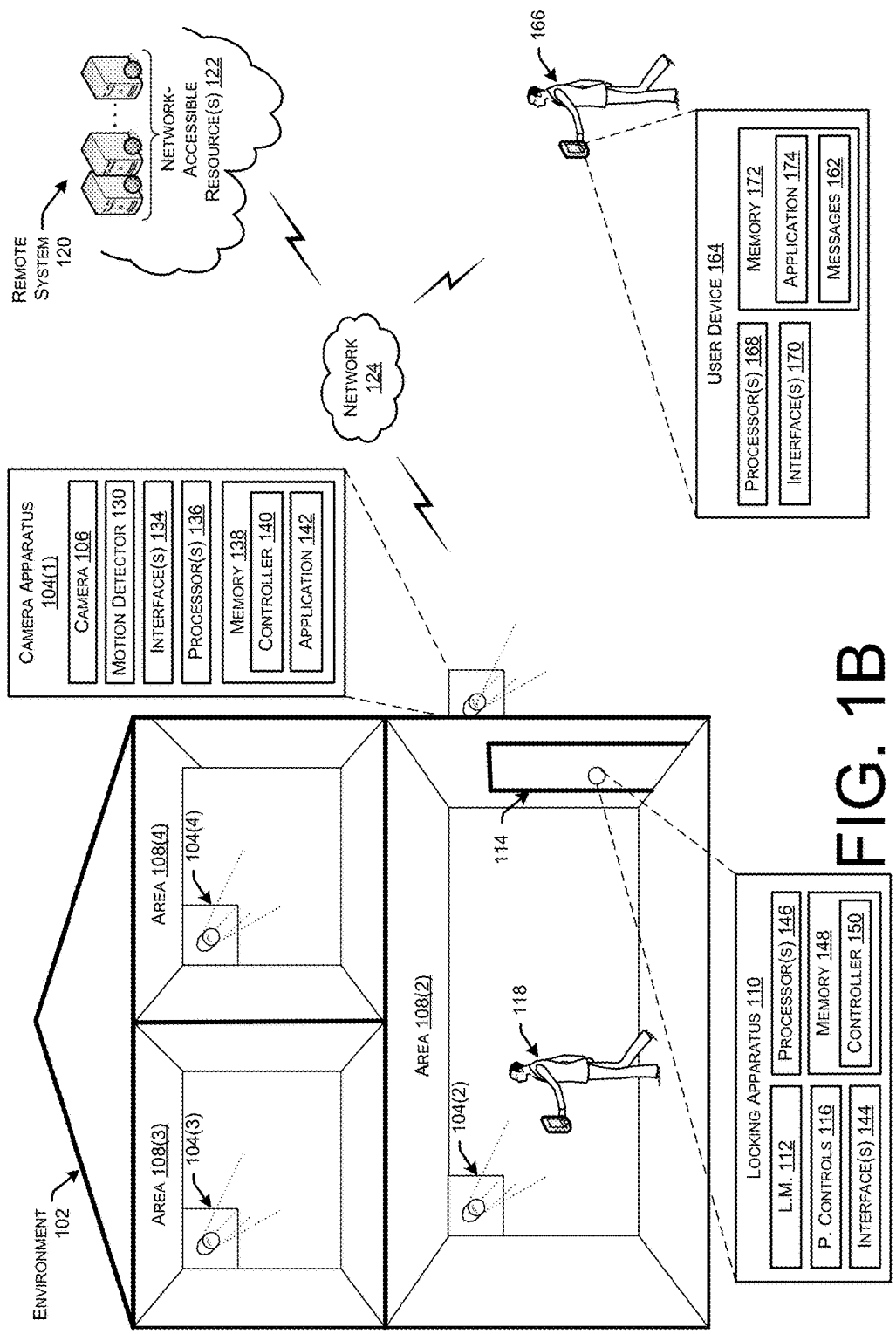
FIG. 1B is a second schematic diagram of a second example of performing the service at the environment. In the example of FIG. 1B, the guest enters the inner areas of the environment to perform an in-home service. In some instances, the remote system is configured to receive image data from a camera apparatus located within a first area of the environment, and then use the image data to determine that the guest is located within the first area. The remote system is further configured to determine that the location of the guest is within a designated zone of the environment for the guest.

FIG. 1B is a second schematic diagram of a second example of performing the service at the environment. In the example of FIG. 1B, the guest 118 enters the environment 102 to perform an in-home service. In some instances, after the guest 118 enters the environment 102, the remote system 120 can use data from the camera apparatuses 104(1)-(4) to monitor the guest 118 within the environment 102.

For instance, the remote system 120 can receive data associated with the second area 108(2) of the environment 102 from the second camera apparatus 104(2). In some instances, the data can include image data, such as still image data and/or video data, representing the second area 108(2). In such instances, the remote systems 120 process the image data (using a similar process as described below for the second camera apparatus 104(2)) after receiving the image data from the second camera apparatus 104(2). Additionally or alternatively, in some instances, the data can include image data that the second camera apparatus 104(2) processes before sending to the remote system 120.

For instance, the second camera apparatus 104(2) can capture image data representing the second area 108(2) associated with the environment 102. The second camera apparatus 104(2) can then process the image data using one or more image processing techniques in order to detect one or more features within the image data. In some instances, the features can include an identity of each guest within the second area 108(2), a position of each guest within the second area 108(2), or the like.

Using the image data from the second camera apparatus 104(2), the remote system 120 can determine the location of the guest 118 within the environment 102. For instance, in the example of FIG. 1B, the remote system 120 can determine that a location associated with the second camera apparatus 104(2) includes the second area 108(2) of the environment 102 and as such, the second camera apparatus 104(2) acquires image data corresponding to (e.g., representing) at least a portion of the second area 108(2). The remote system 120 can then analyze the image data in order to determine that the image data (and/or a portion of the image data) represents the guest 118. Based on determining that the image data represents the guest 118, the remote system 120 can determine that a position for the guest 118 is within the second area 108(2) of the environment 102. The remote system 120 can then determine whether the guest 118 is located within a designated zone for the guest 118 within the environment.

For instance, as discussed above, the remote system 120 can identify one or more designated zones within the environment 102 in which the guest 118 can be located. Based on the one or more designated zones, the remote system 120 can determine whether the guest 118 is inside one of the designated zones or outside of the one or more designated zones. For instance, in the example of FIG. 1B, the remote system 120 may determine that the designated zone for the guest 118 includes the second area 108(2) of the environment 102, but the designated zone does not include the third area 108(3) or the fourth area 108(4) of the environment 102. As such, the remote system 120 in FIG. 1B can determine that the guest 118 is within a designated zone of the environment 102.

In some instances, in response to providing the guest 118 access to the environment 102 and/or determining that the guest 118 is within the one or more designated zones, the remote system 120 may send messages 162 to a user device 164 associated with a profile of a user 166, where the user 116 is associated with the scheduled service. For instance, after providing the guest 118 with access to the environment, the remote system 120 can send a first message 162 to the user device 164 indicating that the guest 118 has been authenticated and now has access to the secure areas 108(2)-(4) of the environment 102. Additionally, based on determining that the guest 118 is within the one or more designated zones, the remote system 120 can send a second message 162 to the user device 164 indicating that the guest 118 is within the one or more designated zones. In some instances, the message 162 can indicate the exact position of the guest 118 within the environment 102 (e.g., the second area 108(2)).

Also illustrated in FIG. 1B, the user device 164 further includes processor(s) 168, network interface(s) 170, and memory 172, which stores application 174 and the message 162. In some instances, the user device 164 can use the application 174 to send and receive messages (e.g., the messages 162, etc.) with the remote system 120, the camera apparatuses 104(1)-(4), and/or the locking apparatus 110. For instance, the user device 164 can use the application 174 to send a message to a camera apparatus 104(1)-(4) that causes the camera apparatus 104(1)-(4) to lock and/or unlock the locking apparatus 110.

Figure 1C:
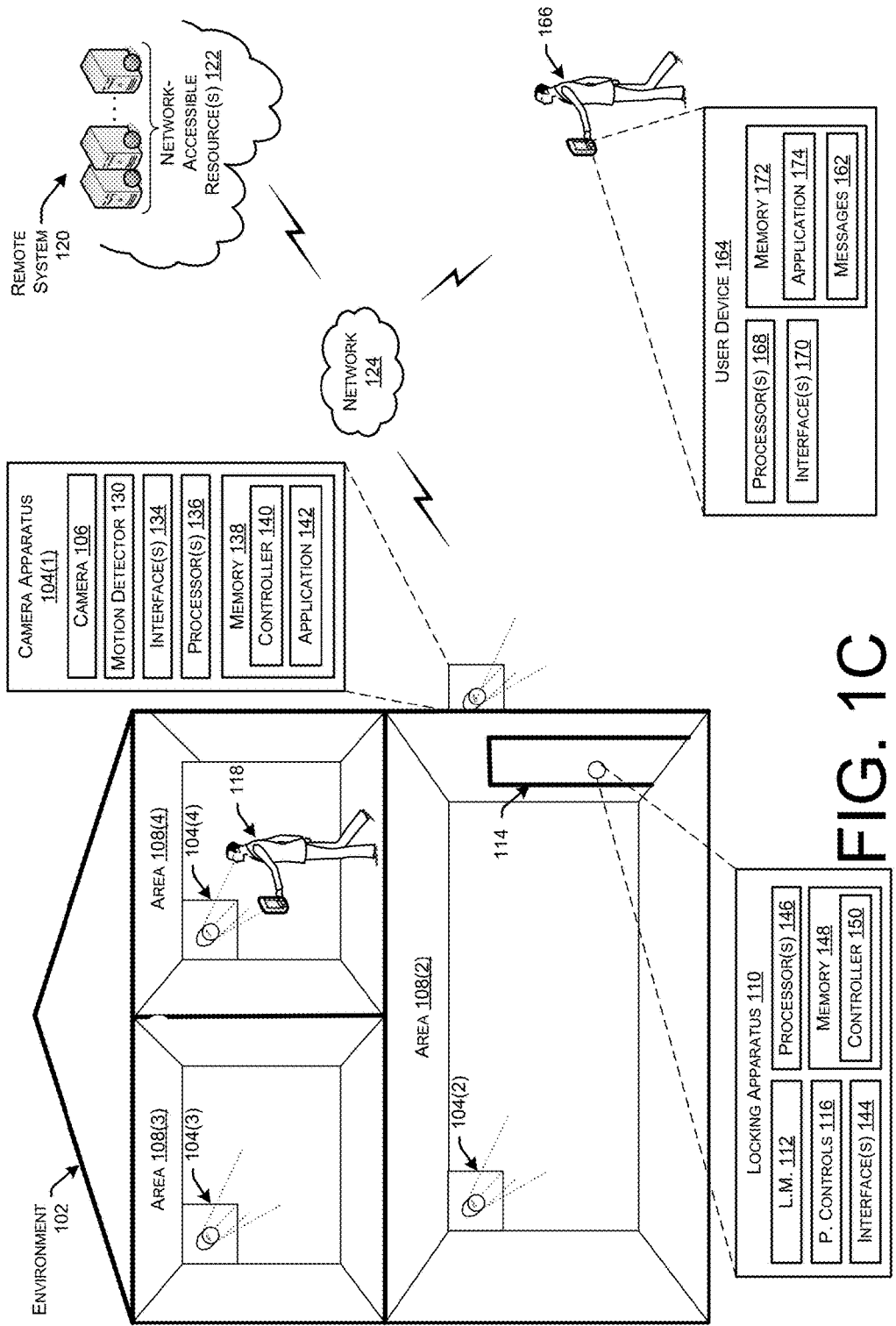
FIG. 1C is a third schematic diagram of a third example of performing the service at the environment. In the example of FIG. 1C, the guest moves from the first area within the environment to a second area within the environment. In some instances, the remote system is configured to receive image data from a camera apparatus located within the second area of the environment, and then use the image data to determine that the guest is located within the second area. The remote system is further configured to determine that the new location of the guest is outside of the designated zone of the environment for the guest. In some instances, the remote system is configured to send a user device a message that indicates the guest is outside of the designated zone.

FIG. 1C is a third schematic diagram of a third example of performing the service at the environment 102. In the example of FIG. 1C, the guest 118 moves from the second area 108(2) within the environment 102 to the fourth area 108(4) within the environment 102. In some instances, while the guest 118 remains in the environment 102, the remote system 120 can use data from the camera apparatuses 104(1)-(4) to continue monitor the guest 118 within the environment 102.

For instance, the remote system 120 can receive data associated with the fourth area 108(4) of the environment 102 from the fourth camera apparatus 104(4). In some instances, the data can include image data, such as still image data and video data, representing the fourth area 108(4). In such instances, the remote systems 120 process the image data (using a similar process as described below for the fourth camera apparatus 104(4)) after receiving the image data from the fourth camera apparatus 104(4). Additionally or alternatively, in some instances, the data can include image data that the fourth camera apparatus 104(4) processes before sending to the remote system 120.

For instance, the fourth camera apparatus 104(4) can capture image data representing the fourth area 108(4) associated with the environment 102. The fourth camera apparatus 104(4) can then process the image data using one or more image processing techniques in order to detect one or more features within the image data. In some instances, the features can include an identity of each guest within the fourth area 108(4), a position of each guest within the fourth area 108(4), or the like.

Using the image data from the fourth camera apparatus 104(4), the remote system 120 can determine the position of the guest 118 within the environment 102. For instance, in the example of FIG. 1C, the remote system 120 can determine that a location associated with the fourth camera apparatus 104(4) includes the fourth area 108(4) of the environment 102 and as such, the fourth camera apparatus 104(4) acquires image data corresponding to at least a portion of the fourth area 108(4). The remote system 120 can then analyze the image data in order to determine that the image data (and/or a portion of the image data) represents the guest 118. Based on determining that the image data represents the guest 118, the remote system 120 can determine that a position for the guest 118 is within the fourth area 108(4) of the environment 102. Based on the one or more designated zones for the guest 118 within the environment 102, the remote system 120 can then determine that the guest 118 is outside of the one or more designated zones (e.g., the second area 108(2)) within the environment 102.

In some instances, in response to determining that the guest 118 is outside of the one or more designated zones, the remote system 120 may send a message 162 to a user device 164. For instance, the remote system 120 can send the user device 164 a message 162 that indicates that the guest 118 is outside of the one or more designated zones. Additionally, in some instances, the message 164 can further indicate that the guest is within the fourth area 108(4) of environment 102. In some instances, the remote system 120 can further send the user device 164 image data (e.g., still image data, video data, etc.) that the remote system 120 receives from the fourth camera apparatus 104(4).

It should be noted that, in some instances, the environment 102 may only include the second camera apparatus 104(2) within the environment 102. In such instances, the remote system 120 can continue to receive image data from the second camera apparatus 104(2) while the guest is still within the environment 102, and process the image data (using the techniques above) to determine whether a position of the guest 118 remains within the second area 108(2) of the environment 102. Based on the remote system 120 determining that the position of the guest 118 is outside of the second area 108(2), the remote system 120 can send the message 162 to the user device 164.

Figure 2:
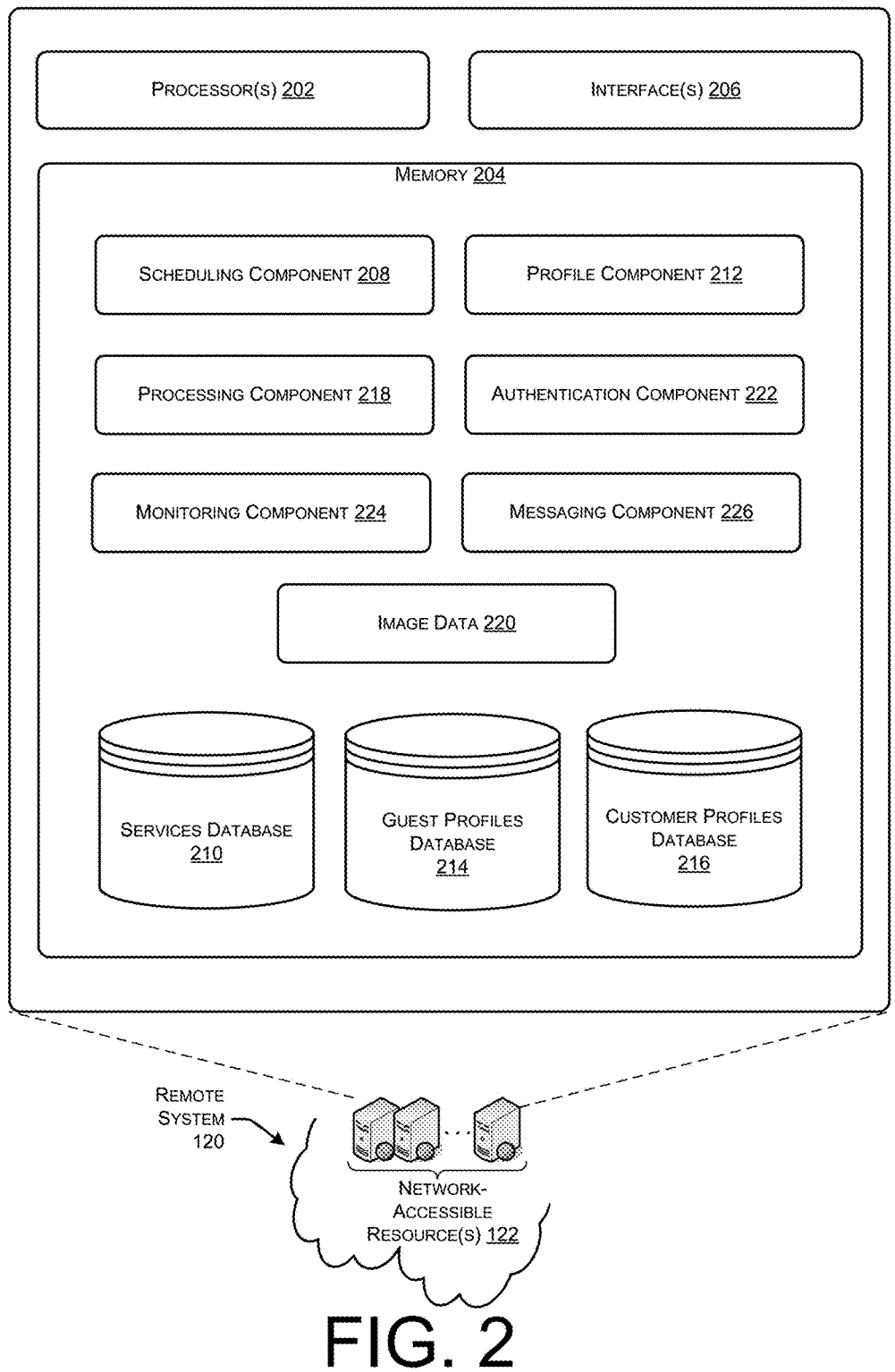
FIG. 2 is a block diagram illustrating relevant functional components of the network accessible resource(s) of the remote system.

FIG. 2 is a block diagram illustrating relevant functional components of the network accessible resource(s) 122 of the remote system 120. In some instances, the network accessible resource(s) 122 may include other components not shown in FIG. 2.

Logical functionality of the remote system 120 may be implemented by one or more processor(s) 202, associated memory 204, and software that is stored in the memory 204 and executed by the processor(s) 202. As discussed above, the processor(s) 202 may include multiple processors and/or a processor having multiple cores. Further, the processor(s) 202 may comprise one or more cores of different types. For example, the processor(s) 202 may include application processor units, graphic processing units, and so forth. In one implementation, the processor(s) 202 may comprise a microcontroller.

The memory 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 204 may be implemented as computer-readable storage media ("CRSM"), which may be any available physical media accessible by the processor(s) 202 execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional modules are shown stored in the memory 204, the same functionality may alternatively be implemented in hardware, firmware, application specific integrated circuits, field programmable gate arrays, or as a system on a chip (SoC). In addition, while not illustrated, each respective memory discussed herein may include at least one operating system (OS) module that is configured to manage hardware resource devices such as the network interface(s), the I/O devices of the respective apparatuses, and so forth, and provide various services to applications or modules executing on the processor(s) 202. Such OS module may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 206 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 206 may include a wide area network (WAN) component to enable communication over a wide area network.

The remote system 120 can include a scheduling component 208 for creating records (e.g., data) for scheduled services stored in the schedules database 210. For instance, the remote system 120 can receive information associated with a scheduled service. The information can include a service location, a service time, an identity of the user, contact information for the user (e.g., phone number, email, etc.), an identity of the guest to perform the service, contact information for the guest (e.g., phone number, email, etc.), information identifying the device associated with a profile of the guest (e.g., MAC address, etc.), or the like. In some instances, when the scheduled service includes a scheduled delivery, the information can further include identities of items being delivered at the environment, characteristics (e.g., size, color, etc.) for each of the items, characteristics (e.g., size, color, weight, etc.) of packages used to package the items, identifiers for each of the packages, or the like. The scheduling component 208 can then use the information associated with the scheduled service to create a record for the scheduled service. After creating the record, the scheduling component 208 can store the record for the scheduled service in the schedules database 210.

In some instances, the remote system 120 can receive the information from a third-party system. The third-party system can include an online marketplace, or other type of online service, that users can use to acquire items and services. In some instances, the remote system 120 can create a record for a scheduled service that occurs more than once at an environment. For instance, the remote system 120 can create a record for a scheduled service that occurs each day, week, month, or the like at an environment.

The remote system 120 can further include a profile component 212 for creating guest profiles stored in the guest profiles database 214. For instance, the remote system 120 can receive information associated with a guest (e.g., a person, robot, etc.). The information can include an identity of the guest, contact information (e.g., phone number, email, etc.) of the guest, image data corresponding to one or more images representing the guest (e.g., facial image, etc.), facial recognition data created from the one or more images that identifies features of a face of the guest (e.g., relative position, size, and/or shape of the guest's eyes, nose, cheekbones, jaw, etc.), services performed by the guest, an identity of a device (e.g., MAC address, etc.), voice data representing a voice of the guest, or the like. The profile component 212 can then use the information associated with the guest to create a guest profile for the guest. After creating the guest profile, the profile component 212 can store the guest profile in the guest profiles database 214.

Additionally, in some instances, the remote system 120 can use the profile component 212 for creating user profiles stored in the user profiles database 216. For instance, the remote system 120 can receive information associated with a user. The information can include an identity of the user, contact information for the user, a location of an environment associated with the user, designations associated with different zones within the environment (e.g., designated zones for different guests), items and/or services acquired by the user, an identity of a device (e.g., MAC address, etc.), or the like. The profile component 212 can then use the information associated with the user to create a user profile for the user. After creating the user profile, the profile component 212 can store the user profile in the user profiles database 216.

The remote system 120 can further include a processing component 218 for performing image processing on image data 220 received from camera apparatuses. For instance, as discussed above, in some instances, the remote system 120 may receive image data 220, such as still image data and video data, from the camera apparatuses. After receiving the image data 220, remote system 120 can use the processing component 218 to process the image data 220 using one or more trained algorithms associated with one or more image processing techniques (e.g., facial recognition, object recognition, voice recognition, etc.). In some instances, processing the image data 220 can include identifying one or more features within the image data 220. For instance, the remote system 120 can use the processing component 218 to process image data 220 in order to identify a number of guests at an environment, a position for each of the guests within the environment, an identity of each of the guests within the environment, or the like.

Additionally, in some instances, when a scheduled service includes a scheduled delivery, the remote system 120 can further use the processing component 218 to process the image data 220 in order to identify a number of packages at the environment, characteristics (e.g., size, color, weight, etc.) for each of the packages, an identifier (name, identification number, etc.) for each of the packages, or the like.

The remote system 120 can further include an authentication component 222 for authenticating objects at environments. For instance, the remote system 120 can receive image data 220 from a camera apparatus located at an environment. In some instances, the image data 220 may have already been processed by the camera apparatus while in some instances, the remote system 120 may process the image data 220 using the processing component 218. The remote system 120 can then utilize the authentication component 222 to authenticate one or more objects at the environment based on the processed image data, using the techniques described above (e.g., facial recognition, item recognition, etc.).

For instance, the authentication component 222 can use data associated with a scheduled service to determine that a service is scheduled at the environment around a time the object arrives at the environment. In some instances, the authentication component 222 can further use the data to determine that the object at the environment corresponds to a guest associated with the service. For example, the authentication component 222 can utilize facial recognition to analyze image data received from a camera apparatus with respect to stored image data depicting the guest in order to determine whether the object corresponds to the guest.

In some instances, when the scheduled service includes a scheduled delivery, the authentication component 222 can perform further techniques to authenticate the object. For instance, the authentication component 222 can utilize one or more algorithms associated with one or more object recognition techniques to analyze the image data in order to determine that the object is in possession of one or more packages associated with one or more items being delivered to the environment. In some instances, the authentication component 222 can make the determination based characteristics of the one or more packages (e.g., a size, shape, color, etc.), an identifier on each of the one or more packages, a number of packages, or the like. In some instances, the authentication component 222 can further determine that a number of objects at the environment is appropriate based on the one or more items. For instance, the authentication component 222 may authenticate two objects when an item includes a mattress, but may not authenticate two objects when the item includes a phone.

After authenticating that an object corresponds to a guest, the remote system 120 can further include a monitoring component 224 for monitoring an environment when the guest is performing an in-home service. For instance, the remote system 120 can receive image data 220 from one or more camera apparatuses located within an environment. In some instances, the image data 220 may have already been processed by the one or more camera apparatuses while in some instances, the remote system 120 may process the image data 220 using the processing component 218. The remote system 120 can then utilize the monitoring component 222 to monitor one or more guests within the environment based on the processed image data, using the techniques described above.

For instance, the monitoring component 224 can track a guest within the environment using the image data 220 in order to determine whether the guest is within one or more designated zones of the environment. As discussed above, a designated zones includes an area within the environment in which the guest is authorized to be located. In some instances, based on determining that the guest is within the one or more designated zones, the monitoring component 224 can continue to track the guest within the environment. In some instances, based on determining that the guest is outside of the one or more designated zones, the monitoring component 224 can further cause a message to be sent to a device of a user that indicates that the guest is outside of the one or more designated zones.

The remote system 120 can further include a messaging component 226 for sending and receive messages (e.g., requests, notifications, alerts, etc.) with other electronic devices. For instance, after the remote system 120 receives a message that a guest arrived at an environment, the remote system 120 can use the messaging component 226 to send a message to one or more camera apparatuses requesting image data. Additionally, in some instances, based on authenticating a guest, the remote system 120 can use the messaging component 226 to send a message to unlock a locking apparatus of the environment. Moreover, in some instances, based on determining that a guest is outside of the one or more designated zones, the remote system 120 can use the messaging component 226 to send a message to the device associated with a user profile indicating that the guest is outside of the one or more designated zones.

Figure 3:
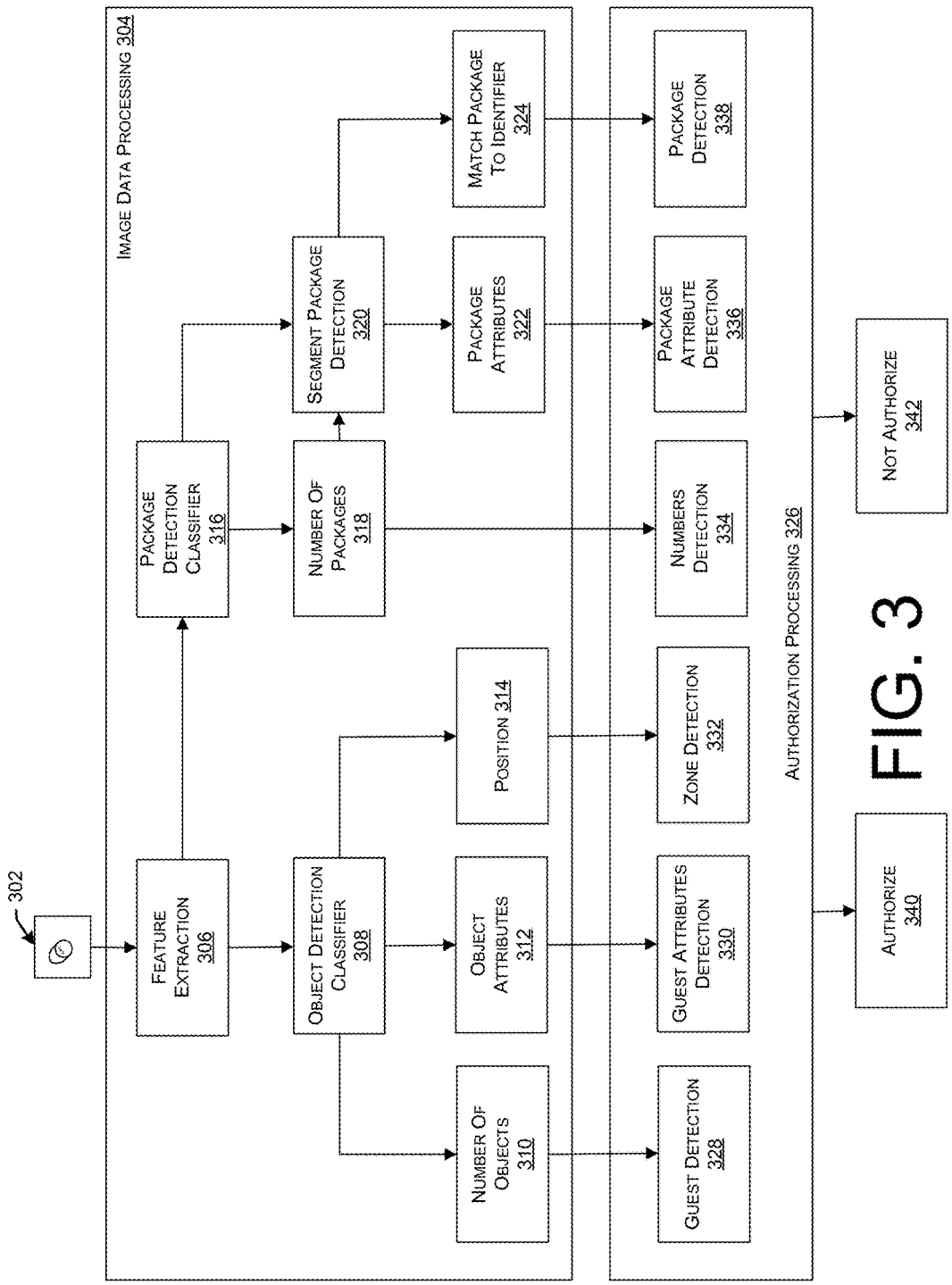
FIG. 3 is a schematic diagram of a process for both authorizing one or more objects at an environment as one or more guests, and then monitoring the one or more guests within the environment.

FIG. 3 is a schematic diagram of an example process for both authorizing that objects at an environment correspond to invited guests, and monitoring one or more guests at an environment. To authorize an object as a guest, a camera apparatus 302, which can represent one of camera apparatus 104(1)-(4), acquires image data for processing using image data processing 304. In some instances, the image data processing 304 can be performed by the camera apparatus 302. In some instances, the image data processing 304 can be performed by the remote system 120. For instance, the remote system 120 can receive the image data from the camera apparatus 302, and then perform the image data processing 304 using the processing component 218.

To process the image data, the image data processing 304 can use one or more image processing techniques (e.g., facial recognition, object recognition, etc.) to extract features 306 from the image data. In some instances, the features can include objects (e.g., guests, robots, etc.) and packages. For instance, the image data processing 304 can identify each object and package that is within the image data.

For objects, the image data processing 304 may include an object detection classifier 308 in order to detect a number of objects 310 within the environment, attributes 312 (e.g., characteristics) associated with each of the objects, and a position 314 for each of the object that are not yet authorized, or each of the guests that have been authorized. For instance, the number of objects 310 can include how many objects are at the environment for authorization. The attributes 312 associated with each object can include a height of the object, hair color of the object, an approximate weight of the object (e.g., 100 pounds), a body type for the object (e.g., slim, heavy, etc.), clothes that the object is wearing, facial recognition of the object, or the like. If the object includes a robot, the attributes 312 may further include a model and/or other identifier associated with the object. The position 314 can include a specific position outside and/or inside of the environment for the object or guest.

For packages, the image data processing 304 can apply a package detection classifier 316 in order to detect a number of packages 318 within the environment. Additionally, for each package, the image data processing 304 can perform segment package detection 320 in order to determine attributes 322 (e.g., characteristics) for each of the packages at the environment and detect an identifier 324 for each of the packages at the environment.

Attributes 322 for each package can include a relative size of the package (e.g., small, medium, big, etc.), a color of the package, a shape of the package, or the like. An identifier 324 for a package can include any type of identity that is located on the package. For instance, the identifier 324 for a package can include a name of an item located on the package, an identification code (e.g., barcode, serial number, etc.) located on the package, a logo and/or other symbol located on the package, or the like.

In the example process of FIG. 3, authorization processing 324 is then performed using the number of objects 310, the attributes 312 for each of the objects, the position 314 of each of the object and/or guests, the number of packages 318, the attributes 322 of each package, and the identifier 324 of each package. In some instances, the authorization processing 324 is performed by the camera apparatus 302. Additionally or alternatively, in some instances, the authorization processing 324 is performed by the remote system using the authentication component 222 and the monitoring component 224.

As illustrated, the authorization processing 324 includes a guest detection 328 component that authorized objects based on the number of objects 310 at the environment. For instance, the guest detection 328 component can first determine types of items and/or a number of items being delivered at the environment. The guest detection 328 component can then determine whether an appropriate number of objects is at the environment based on the types of items and/or number of items. For instance, based on a single package being delivered at an environment, the guest detection 328 can determine that it is appropriate for one object to be at the environment performing a delivery.

The authorization processing 324 further includes a guest attributes detection 330 component that authorizes object based on detected attributes 312. For instance, the guest attributes detection 330 component can authorize each object based on a height of the object, hair color of the object, an approximate weight of the object (e.g., 100 pounds), a body type for the object (e.g., slim, heavy, etc.), clothes that the object is wearing, facial recognition of the object, model of the object, or the like. In some instances, authorizing the object can include determining that the object corresponds to a guest based on the attributes. For instance, the guest attributes detection 330 component can identify the object at the environment using the attributes, and then determine that the object corresponds to the guest that is associated with a scheduled service at the environment.

The authorization processing 326 further includes a zone detection 332 component that authorizes object at the environment and/or monitors authorized guests are within one or more designated zones of the environment. For instance, the zone detection 332 component can analyze the position 314 of each guest in the environment using one or more designated zones for guests within the environment. Based on the analyzing, the zone detection 332 component can determine whether each guest is within the one or more designated zones, or whether each guest is outside of the one or more designated zones.

The authorization processing 326 can further include a numbers detection 330 component to authorize that a correct number of packages is at the environment. For instance, the numbers detection 330 component can use data associated with a scheduled service to determine a number of packages that are being delivered to the environment. The numbers detection 330 component can then determine whether the number of packages 318 from the image data corresponds to (e.g., matches) the number of packages being delivered at the environment.

The authorization processing 326 can further include a package attribute detection 332 component to authorize each package at the environment. For instance, the size detection 332 component can use data associated with the scheduled service to determine attributes associated of each package being delivered to the environment. In some instances, the attributes for a package can include a relative size of the package (e.g., small, medium, big, etc.), a color of the package, a shape of the package, or the like. The package attribute detection 332 component can then determine whether one or more of the attributes 322 of each package from the image data corresponds to (e.g., matches) the attributes of each package being delivered to the environment.

The authorization processing 326 can further include a package detection 338 component for authorizing an identity of each of the packages within the image data. For instance, the package detection 338 component can use the data associated with the scheduled service to determine an identity of each package being delivered to the environment. In some instances, the identity can include a name of an item located on the package, an identification code (e.g., barcode, serial number, etc.) located on the package, a logo and/or other symbol located on the package, or the like. The package detection 334 component can then determine whether the identifier 324 of each package from the image data corresponds to (e.g., matches) the identity of each package being delivered to the environment.

In the example process of FIG. 3, the camera apparatus 302 and/or the remote system that performed the authorization processing 326 can then authorize 340 that objects correspond to guests and/or not authorize 342 objects (e.g., determine that the objects do not correspond to guests). In some instances, the one or more objects are authorized 340 when each of the components 328-338 of the authorization processing 326 sends positive feedback. For instance, the one or more objects may be authorized 340 when the correct number of objects are at the environment, the attributes of each objects corresponds to the attributes of the guests associated with the scheduled service, positions for the objects is correct, the correct number of packages is at the environment, the attributes of each package corresponds to the attributes of the packages being delivered to the environment, and the identifier for each packages corresponds to an identifier of a package being delivered at the environment.

In some instances, the one or more objects are authorized 320 when a threshold number of the components 328-338 of the authorization processing 326 sends positive feedback. For instance, the one or more objects may be authorized 340 when the correct number of packages is at the environment and the identifier for each package corresponds to an identifier of a package being delivered at the environment.

FIG. 4 illustrates examples of images that the remote system can use when authenticating guests at an environment. In some instances, a camera apparatus captures image data corresponding to each of the images 402-410 at the environment. The camera apparatus then sends the image data to a remote system for authentication. In some instances, the remote system analyzes the image data using one or more trained algorithms associated with one or more image processing techniques, such as facial recognition and/or object recognition, to authenticate objects at the environment. For instance, the remote system can use data associated with a scheduled service to process the image data in order to authenticate and/or not authenticate the objects. For instance, the data can indicate that a single package is being delivered at the environment, the guest (e.g., delivery person) is a male, the package is small in size, the package is red (e.g., which corresponds to diagonal lines in FIG. 4), or the like.

In the example of FIG. 4, the remote system can receive image data associated with the first example image 402 from the camera apparatus. The remote system can then process the image data in order to identify features associated with the first example image 402. For instance, the remote system can identify that the image data represents a male object, that the male object is in possession of a single package, the package is small in size, and that the package is red. The remote system can then analyze the features associated with the image data using the data associated with the scheduled service. For instance, the remote system can determine that the correct male guest (e.g., the object) is at the environment, that the male object is in possession of the correct number of packages, that the package includes the correct size, and that the package includes the correct red color. Based on the analyses, the remote system can determine that the object corresponds to the guest and as such, the remote system can authenticate the guest.

Additionally, the remote system can receive image data associated with the second example image 404 from the camera apparatus. The remote system can then process the image data in order to identify features associated with the second example image 404. For instance, the remote system can identify that the image data represents three objects (two male people one female person), that the objects are in possession of a single package, the package is small in size, and that the package is red. The remote system can then analyze the features associated with the image data using the data associated with the scheduled service. For instance, the remote system can determine that too many objects are at the environment, that the objects are in possession of the correct number of packages, that the package includes the correct size, and that the package includes the correct red color. Based on the analyses, the remote system may not authenticate the objects at the environment since too many objects are at the environment.

Furthermore, the remote system can receive image data associated with the third example image 406 from the camera apparatus. The remote system can then process the image data in order to identify features associated with the third example image 406. For instance, the remote system can identify that the image data represents a male object, that the object is in possession of a single package, the package is large in size, and that the package is red. The remote system can then analyze the features associated with the image data using the data associated with the scheduled service. For instance, the remote system can determine that the correct male object is at the environment, that the object in possession of the correct number of packages, that the package does not include the correct size, and that the package includes the correct red color. Based on the analyses, the remote system may not authenticate the object at the environment since the package does not include the correct package size.

Moreover, the remote system can receive image data associated with the fourth example image 408 from the camera apparatus. The remote system can then process the image data in order to identify features associated with the fourth example image 408. For instance, the remote system can identify that the image data represents a male object, that the object is in possession of a single package, the package is small in size, and that the package is green (which corresponds to the checkered package in FIG. 4). The remote system can then analyze the features associated with the image data using the data associated with the scheduled service. For instance, the remote system can determine that the correct male object is at the environment, that the object is in possession of the correct number of packages, that the package includes the correct size, and that the package does not include the correct red color. Based on the analyses, the remote system may not authenticate the object at the environment since the package does not include the correct red color.

Finally, the remote system can receive image data associated with the fifth example image 410 from the camera apparatus. The remote system can then process the image data in order to identify features associated with the fifth example image 410. For instance, the remote system can identify that the image data represents a female object, that the object is in possession of a single package, the package is small in size, and that the package is red. The remote system can then analyze the features associated with the image data using the data associated with the scheduled service. For instance, the remote system can determine that the incorrect object is at the environment, that the object is in possession of the correct number of packages, that the package includes the correct size, and that the package includes the correct red color. Based on the analyses, the remote system may not authenticate the object at the environment since the correct guest is not at the environment.

Figure 5:
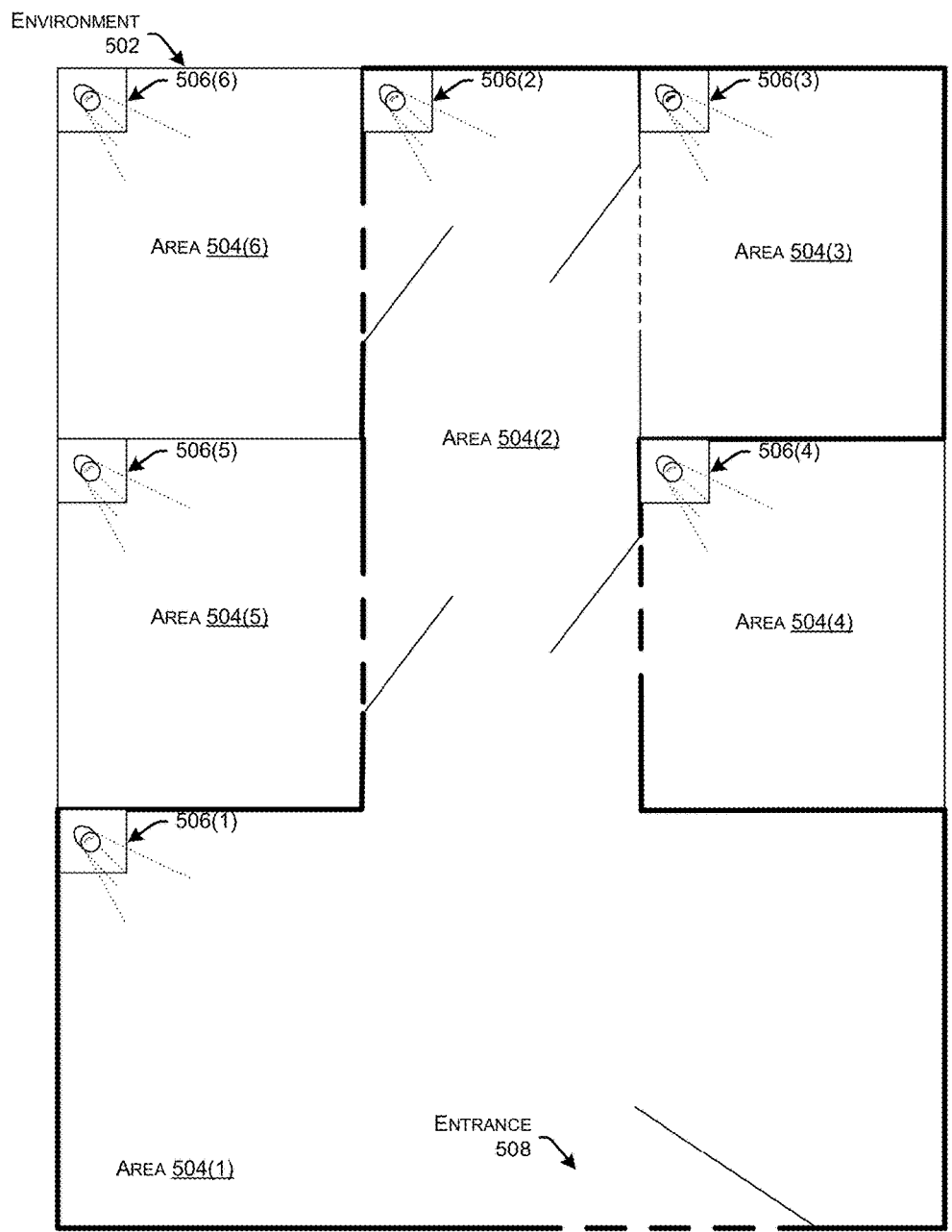
FIG. 5 illustrates an example layout of an environment that indicates designated zones for a guest performing an in-home service.

FIG. 5 illustrates an example layout of an environment 502 that indicates designated zones (indicates by the bold lines) for a guest performing an in-home service. For instance, in the example of FIG. 5, the environment 502 includes six different areas 504(1)-(6) in which the guest may have access when within the environment. Each of the six areas 504(1)-(6) may include a respective camera apparatus 506(1)-(6) that acquires image data representing the respective area 504(1)-(6). For instance, the first camera apparatus 506(1) acquires image data representing the first area 504(1), the second camera apparatus 506(2) acquires image data representing the second area 504(2), the third camera apparatus 506(3) acquires image data representing the third area 504(3), the fourth camera apparatus 506(4) acquires image data representing the fourth area 504(4), the fifth camera apparatus 506(5) acquires image data representing the fifth area 504(5), and the sixth camera apparatus 506(6) acquires image data representing the sixth area 504(6).

In some instances, a user associated with the environment 502 can schedule the in-home service. When scheduling the in-home service, the user can designate one or more areas 504(1)-(3) within the environment as zones in which the guest is authorized to occupy. For instance, if the scheduled service includes a scheduled delivery at the environment 502, the user can designate that the guest should delivery the package within the third area 504(3) of the environment 502. Based on the designated, a remote system can determine that one or more designated zones for the in-home service in which the guest can be located include the first area 504(1), the second area 504(2), and the third area 504(3). For instance, the remote system can determine that the guest has to access each of the first area 504(1) and the second area 504(2) in order to move from the entrance 508 of the environment to the third area 504(3).

In some instances, the remote system uses the one or more designated zones when monitoring the environment 502. For instance, after the remote system provides the guest with access to the environment 502, the remote system can request image data from one or more of the camera apparatuses 506(1)-(6). The remote system can then use the image data to track the guest as the guest performs in the in-home service within the environment 502.

For instance, the remote system can continually and/or periodically determine a position of the guest within the environment 502 using the image data. In some examples, the remote system can determine a position of the guest within the environment 502 based on the image data depicting the guest. For instance, the remote system can receive image data from the first camera apparatus 606(1), and then analyze the image data using the techniques described above (e.g., facial recognition, image recognition, etc.). Based on the analysis, the remote system may determine that the image data depicts the guest. Since image data received from the first camera apparatus 506(1) depicts the guest, the remote system may determine that a position for the guest is within the first area 504(1). The remote system can continue using a similar process using image data from each of the camera apparatuses 506(1)-(6).

While monitoring the guest, the remote system can determine whether the position of the guest is within the one or more designated zones (e.g., areas 504(1)-(3)). In some instances, based on the position of the guest being within the one or more designated zones, the remote system continues to track the movement of the guest. In some instances, based on the position of the guest being outside of the one or more designated zones (e.g., areas 504(4)-(6)), the remote system further sends a message to a device of the user indicating that the guest is outside of the one or more designated zones.

It should be noted that, in some instances, the remote system can perform a similar process for scheduled services other than scheduled deliveries. For example, the scheduled service can include a catering service and the user can send the remote system a message indicate an area within the environment 502 that includes the kitchen (e.g., the fourth area 504(4)). The remote system can then determine the one or more designated zones based on the area of the kitchen. For another example, the in-home service can include a cleaning service and the user can designate one or more areas within the environment 502 for cleaning (e.g., the third area 504(3) and the sixth area 504(6). The remote system can then determine the one or more designated zones based on the areas that are getting cleaned.

Figure 6:
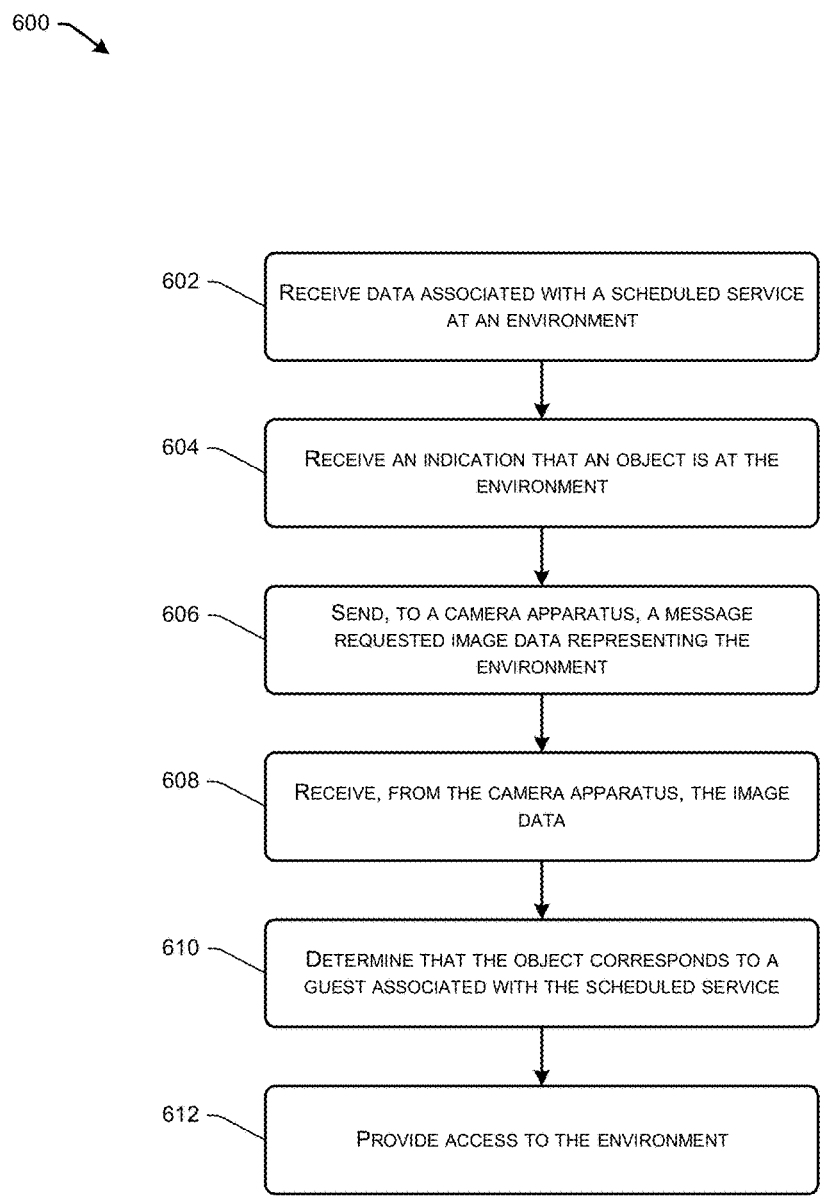
FIG. 6 illustrates a flow diagram of an example process for authenticating an object at an environment using data from a camera apparatus.

FIG. 6 illustrates a flow diagram of an example process for authenticating a guest at an environment using data from a camera apparatus. This process (as well as each process described herein) is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, the operations performed in the processes 600-800 are performed by the remote system 120. In some instances, the operations performed by the processes 600-800 can be performed by another electronic device, such as one of the camera apparatuses 104(1)-(4).

At 602, the remote system 120 receives data associated with a scheduled service at an environment. For instance, the remote system 120 can receive the data from a scheduled databased stored on the remote system 120 and/or another electronic device. The data indicate at least a service to be performed within the environment, and an identity of a guest to perform the service. In some instances, the scheduled service can include a scheduled delivery, and the service can include an in-home delivery within the environment.

At 604, the remote system 120 receives an indication that an object is at the environment. For instance, the remote system 120 can receive a message indicating that the object (e.g., a person, robot, etc.) arrived at the environment. In some instances, the remote system 120 can receive the message from a device associated a profile of the guest. In some instances, the remote system 120 can receive the message from a camera apparatus located at the environment. For instance, the camera apparatus can detect the object using a motion detector and/or a camera. Based on detecting the object, the camera apparatus can then send the message to the remote system 120.

Still, in some instances, the remote system 120 can receive the message from a third-party service. For example, the object may work for a company that provides the scheduled service. In such an example, the company can then receive an indication that the object is at the environment and in response, send the message to the remote system 120. In some instances, the third-party service can receive the indication from the device with the profile. For instance, the third-party service may receive a message from the device that indicates that the object is at the environment. Additionally or alternatively, in some instances, the third-party service can receive the indication based on determining that the object device is within a threshold distance of the environment 102 using location data from the device. For instance, the third-party service may receive Global Positioning System (GPS) data from the device and use the GPS data to determine that the device is within a threshold distance from the environment 102.

At 606, the remote system 120 sends, to a camera apparatus, a request for image data representing the environment. For instance, based on receiving the indication that the object the environment, the remote system 120 can send a camera apparatus located at the environment a request for image data representing the environment. In some instances, the camera apparatus acquires image data representing an outer area of the environment.

At 608, the remote system receives, from the camera apparatus, the image data. For instance, based on sending the request, the remote system 120 can receive the image data from the camera apparatus. In some instances, the image data includes still image data and video data. The remote system 120 can then process the image data using one or more image processing techniques in order to identify features within the image data. Additionally or alternatively, in some instances, the camera apparatus processes the image data before sending the image data to the remote system 120.

At 610, the remote system 120 determines that the object corresponds to a guest associated with the scheduled environment. In some instances, the remote system 120 utilizes facial recognition to analyze the image data with respect to image data depicting the guest and/or with respect to the facial recognition data in order to determine that the object corresponds to the guest. When performing facial recognition, the remote system can first determine a portion of the image data that represents a face of the object, and then analyze the portion of the image data using facial recognition. In some instance, the remote system can determine, based on the analysis, that the image data and/or the portion of the image data represents the guest.

In some instances, the remote system 120 determines that the object corresponds to the guest using the identified features within the image data and/or a portion of the image data. For instance, the remote system 120 can utilize object recognition to identify a name tag or other identifier in possession of the object. The remote system 120 can then use the identifier to determine that the object corresponds to the guest. For instance, the remote system 120 can use the data associated with the scheduled service to determine that the identifier is associated with the guest.

In some instances, additionally or alternatively from identifying the object, the remote system 120 can determine that the object corresponds to the guest based on determining that the image data represents one or more items. For instance, based on a type of service being performed, the remote system 120 can determine that the object should be in possession of one or more specific items. For example, if the service includes an in-home delivery, the remote system 120 can determine that the object should be in possession of at least one package. For another example, if the service includes a cleaning service, the remote system 120 can determine that the object should be in possession of cleaning products.

In such instances, the remote system 120 can analyze the image data using object recognition to determine that the image data represents one or more items. Based on determining that the image data represents an item, the remote system can determine that the item is at the environment and/or that the object is in possession of the item. The remote system 120 can then determine whether the detected item is associated with the scheduled service. For instance, if the service includes an in-home delivery, the remote system 120 can detect that the object is in possession of a package. The remote system 120 can then perform one or more techniques (described above) to determine whether the package is associated with the scheduled service. Based on the object being in possession of an authenticated package, the remote system 120 can determine that the object corresponds to the guest.

At 612, the remote system 120 provides access to the environment. In some instances, the remote system 120 can send a message to a lock control apparatus (e.g., one of the camera apparatuses, another electronic device within the environment, etc.) that causes the lock control apparatus to unlock a locking apparatus of the environment. Based on receiving the message, the lock control apparatus can send an additional message (and/or relay the message) to the locking apparatus that causes the locking apparatus to unlock an entrance of the environment. Additionally or alternatively, in some instances, the remote system 120 can send a message to the locking apparatus that causes the locking apparatus to unlock the entrance of the environment.

In some instances, after providing access to the environment, the remote system 120 can send the device associated with a profile of the guest a message indicating one or more designated zones within the environment in which the guest has authorization to access. In some instances, the remote system 120 can further send a message to a device associated with a profile of the user indicating that the guest is within the environment.

Figure 7:
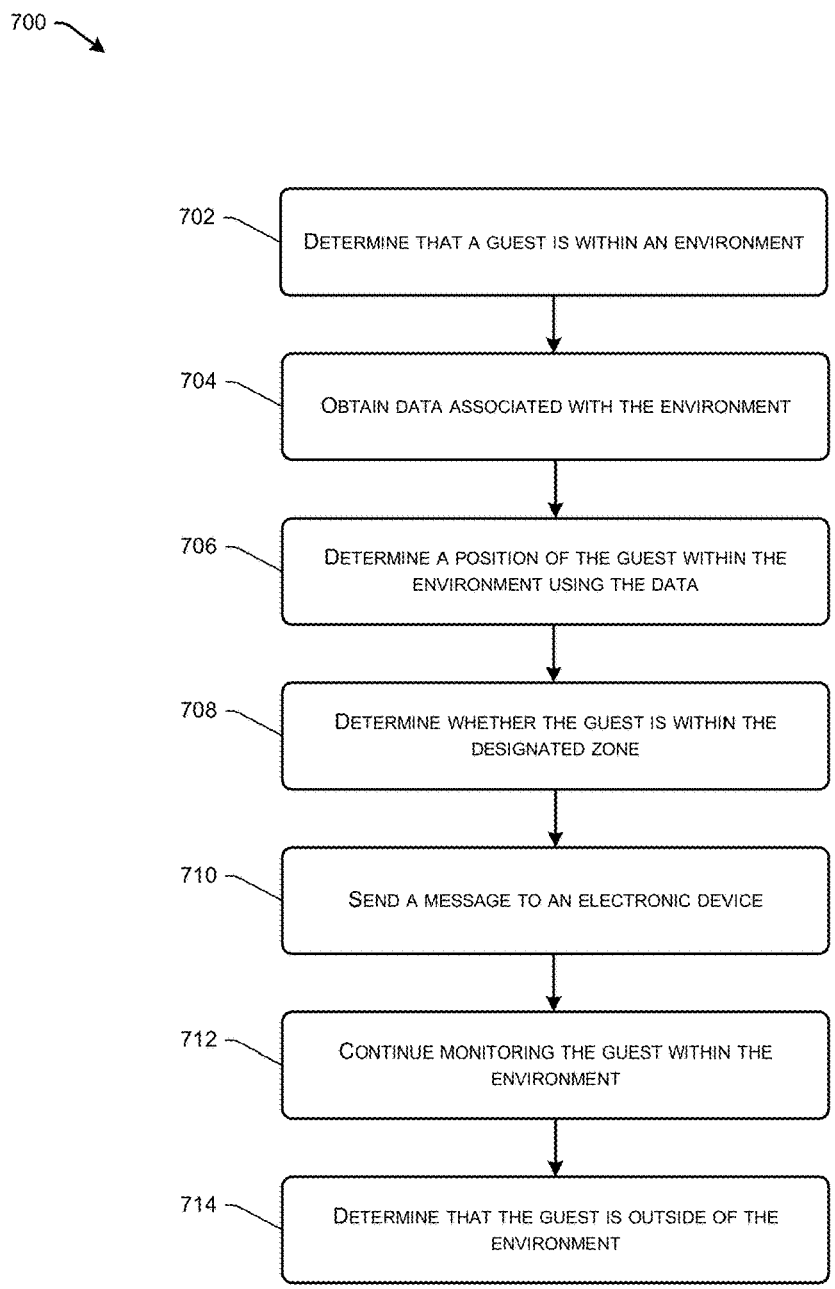
FIG. 7 illustrates a flow diagram of an example process for monitoring a guest within an environment during an in-home service.

FIG. 7 illustrates a flow diagram of an example process 700 for monitoring a guest within an environment during an in-home service. In some instances, the example process 700 of FIG. 7 occurs after the example process 600 of FIG. 6. For instance, after the guest enters the environment to perform the in-home service, the remote system 120 can begin monitoring the environment using image data from one or more camera apparatuses.

At 702, the remote system 120 determines that a guest is within an environment. For instance, the remote system 120 can authenticate a guest at an entrance of the environment. Based on authenticating the guest, the remote system 120 can provide the guest with access to the environment. In some instances, the guest is scheduled to perform an in-home service within the environment. In some instances, in-home service can include an in-home delivery of a package.

At 704, a remote system 120 obtains data associated with the environment. For instance, the remote system 120 can send a request for the data to a camera apparatus located within the environment. In some instances, the remote system 120 may send the request after a guest enters the environment to perform an in-home service. The camera apparatus can then receive the request from the remote system 120 and based on receiving the request, send the data back to the remote system 120. In some instances, the camera apparatus sends the remote system 120 image data, such as still image data and video data, acquired within the environment. In some instances, the camera apparatus first processes the image data to in order to detect one or more features within the environment. The camera apparatus then sends the processed image data to the remote system 120.

At 706, the remote system 120 determines a position for the guest within the environment using the data. For instance, the remote system 120 can analyze image data and/or a determined portion of the image using one or more image processing techniques in order to determine that the image data and/or the portion of the image data represents the guest. Based on the position of the camera apparatus in the environment, the remote system 120 can then determine a position for the guest within the environment. For instance, the remote system 120 can determine that the camera apparatus acquires image data from a specific area within the environment. The remote system 120 can then determine that the guest is within the specific area based on detecting the guest within the image data.

At 708, the remote system 120 determines whether the guest is within a designated zone of the environment. For instance, the remote system 120 can identify one or more designated zones within the environment in which the guest is authorized to be located (e.g., designated zones for the scheduled service). In some instances, the remote system 120 identifies the one or more designated zones based on a message received from a device associated with a profile of the user. In some instances, the remote system 120 can identify the one or more designated zones based on a type of service being performed within the environment.

For instance, the remote system 120 can determine areas within the environment that the guest needs to access in order to perform the in-home service. For example, if the in-home service includes a catered dinner, the remote system 120 can determine that the guest (e.g., a chef) needs access to the kitchen as well as any other areas between an entrance of the environment and the kitchen. For another example, if the in-home service includes a scheduled delivery, the remote system can determine a specific zone within the environment for placing packages associated with the delivery. The remote system 120 can then determine areas of the environment that the guest needs access to in order to deliver the packages at the specific zone.

At 710, the remote system 120 sends a message to an electronic device. For instance, the remote system 120 can send a message to a device associated with a profile of the user. In some instances, based on the guest being outside of the designated zone, the message can indicate that the guest is outside of the one or more designated zones. In some instances, based on the guest being within the designated zone, the message can indicate a position of the guest within the environment. In some instances, the message can further include image data of the environment showing the position of the guest within the environment.

At 712, the remote system 120 continues to monitor the guest within the environment. For instance, the remote system 120 can continue to receive image data from the camera apparatus and/or another camera apparatus within the environment. Using the image data, the remote system 120 can track a position of the guest within the environment as the guest performs the in-home service. For instance, the remote system can continue to analyze received image data (and/or portions of the image data) to determine that the image data (and/or the portion of the image data) represents the guest. While tracking the guest, the remote system 120 can determine whether the position of the guest remains within a designated zone of the environment, or if the position of the guest falls outside of the one or more designated zones of the environment.

At 714, the remote system 120 determines that the guest is outside of the environment. For instance, the remote system 120 can receive image data from a camera apparatus and determine, based on the image data, that the guest is no longer within environment. In some instances, the remote system 120 can receive the image data from one or more camera apparatus within the environment and determine that the guest is no longer within the environment based on not detecting the guest within the environment. In some instances, the remote system 120 can receive the image data from a camera apparatus located outside the environment and determine that the guest is no longer within the environment by determining that a position of the guest is outside of the environment.

In some instances, based on determining that the guest is outside of the environment, the remote system 120 stops monitoring the environment. For instance, the remote system 120 can send a message to the one or more camera apparatus that requests the one or more camera apparatuses to stop sending the image data to the remote system 120. In some instances, the remote system 120 can further cause the locking apparatus to secure the environment. For example, the remote system 120 can send a message to a lock control apparatus (e.g., a camera apparatus). Based on the message, the lock control apparatus can send an additional message (and/or relay the message) to the locking apparatus that causes locking apparatus to lock the entrance of the environment. For another example, the remote system 120 can send a message to the locking apparatus that causes the locking apparatus to lock the entrance.

Figure 8:
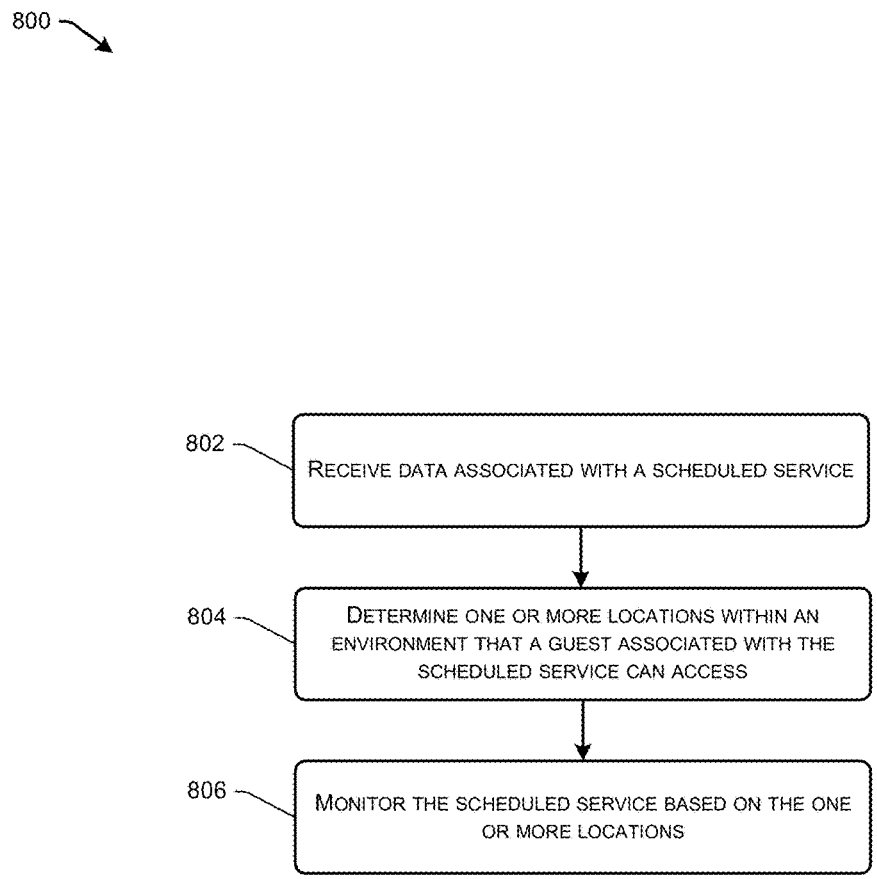
FIG. 8 illustrates a flow diagram of an example process for designating zones of an environment for a scheduled service, and then using the designated zones to monitor a guest within an environment.

FIG. 8 illustrates a flow diagram of an example process for designating zones of an environment for a scheduled service, and using the designated zones to monitor a guest within an environment. At 802, the remote system 120 receives data associated with a scheduled service. For instance, the remote system 120 can receive data indicating a type of in-home service being performed, a location for the in-home service, a time scheduled for the in-home service, or the like.

At 804, the remote system 120 determines one or more zones within an environment that a guest associated with the scheduled service can access. For instance, the remote system 120 may receive a message from a device associated with a profile of a user that designates the one or more areas (e.g., designated zones) within the environment that the guest can access when performing the in-home service. In some instances, the message may include a list of areas within the house that the guest can access. Additionally or alternatively, in some instances, the message can include a floor plan of the environment that indicates the one or more areas.

In some instances, in addition to or alternatively from receiving the message, the remote system can determine the one or more zones within the environment. For instance, the remote system 120 can identify a type of service that is being performed in the environment based on the scheduled service. Based on the type of service, the remote system 120 can determine areas within the environment that the guest needs to access. For instances, if the service includes an in-home delivery, the remote system 120 can determine a zone for placing a package within the environment based on a type of item being delivered. The remote system 120 can then use the zones to determine the one or more zones within the environment. For instance, the remote system 120 can determine that the one or more zones include the zone for placing the package as well as any other zones between the zone and an entrance of the environment.

At 806, the remote system 120 monitors the environment during the scheduled service based at least in part on the one or more zones. For instance, the remote system 120 can receive image data from one or more camera apparatuses located within the environment. The remote system 120 can then use the image data to track a position of the guest within the environment. While tracking the guest, the remote system 120 can determine whether the position of the guest stays within the one or more designated zones and/or falls outside of the one or more designated zones.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   at least one database to store:
      scheduling data associated with delivery of a physical package, the scheduling data indicating at least a delivery item and a delivery location; and
      profile data associated with a delivery person, the profile data including facial recognition data that can be used to identify the delivery person from image data representing the delivery person;
   one or more network interfaces to communicate with a camera apparatus located at the delivery location;
   one or more processors; and
   one or more computer-readable media storing computer-instructions that, when executed by the one or more processors, cause the one or more processors to perform acts comprising:
      receiving, from a device associated with the profile data, a first message indicating that the device is at the delivery location;
      sending, to the camera apparatus located at an environment associated with the delivery location, a second message requesting the image data captured by the camera apparatus;
      receiving, from the camera apparatus, the image data;
      determining, using the facial recognition data and a first portion of the image data, that the delivery person is at the delivery location;
      analyzing the image data using object recognition;
      determining, based at least in part on analyzing the image data, that a second portion of the image data represents an item;
      determining, based at least in part on the second portion of the image data representing the item, that the delivery person is in possession of the delivery item;
      sending, to a lock control apparatus, a third message that causes a locking apparatus associated with an entrance of the environment to provide access to the delivery person; and
      sending, to the device, a fourth message indicating a zone within the environment for placing the delivery item.

2. The system as recited in claim 1, wherein the image data represents a particular person, and the acts further comprising:
   determining the first portion of the image data, the first portion of the image data representing a face of the particular person; and
   analyzing features of the first portion with respect to the facial recognition data using facial recognition,
   and wherein determining that the delivery person is at the delivery location is based at least in part on analyzing the features of the first portion.

3. The system as recited in claim 1, the acts further comprising:
   receiving, from an additional camera apparatus located within the environment, additional image data captured by the additional camera apparatus;
   determining that the additional camera apparatus is located within an area of the environment corresponding to the zone;
   determining that a portion of the additional image data represents the delivery person; and
   determining that a position of the delivery person corresponds to the zone based, at least in part, on the portion of the additional image data representing the delivery person.

4. The system as recited in claim 1, the acts further comprising:

receiving, from an additional camera apparatus located within the environment, additional image data captured by the additional camera apparatus;

determining that the additional camera apparatus is located within an area of the environment that is outside of the zone;

determining that a portion of the additional image data represents the delivery person;

determining that a position of the delivery person is outside of the zone based, at least in part, on the portion of the additional image data representing the delivery person; and sending a fifth message to an electronic device, the fifth message indicating that the delivery person is outside of the zone.

5. The system as recited in claim 1, wherein determining that the image data represents the delivery item comprises:

determining, based at least in part on analyzing the image data, that the second portion of the image data represents a package;

analyzing the second portion in order to determine a size of the package; and determining that the package is associated with the delivery item based, at least in part, the size of the package corresponding to a predetermined size of the delivery item.

6. A method comprising:

storing, by one or more computing devices, data representing an object that is to be at an environment;

receiving, by the one or more computing devices, information indicating that a guest is at the environment;

sending, by the one or more computing devices, a first message to a camera apparatus, the first message including a request for image data representing a zone of the environment;

receiving, by the one or more computing devices and from the camera apparatus, the image data representing the zone of the environment;

analyzing, by the one or more computing devices, the image data with respect to the data representing the object;

determining, by the one or more computing device, and based at least in part on analyzing the image data, that at least a portion of the image data represents the object;

determining, by the one or more computing device, that the guest is in the environment based, at least in part, on determining that the at least the portion of the image data represents the object;

sending, by the one or more computing devices and to a device located at the environment, a second message that causes the device to grant access to the environment;

determining, by the one or more computing devices, that the guest is leaving the environment; and sending, by the one or more computing devices, a third message that causes the device to secure the environment.

7. The method as recited in claim 6, wherein the camera apparatus comprises a first camera apparatus and the image data comprises first image data, and wherein the method further comprises:

receiving, from a second camera apparatus, second image data representing an additional area of the environment;

determining that the additional area of the environment corresponds to a designated zone for the guest based, at least in part, on a location of the second camera apparatus within the environment;

determining that a portion of the second image data represents the guest; and determining that a current position of the guest within the environment corresponds to the designated zone based, at least in part, on the portion of the second image data representing the guest.

8. The method as recited in claim 6, wherein the camera apparatus comprises a first camera apparatus and the image data comprises first image data, and wherein the method further comprises:

receiving, from a second camera apparatus, second image data representing an additional area of the environment;

determining that the additional area of the environment is outside of a designation zone for the guest based, at least in part, on a location of the second camera apparatus within the environment;

determining that a portion of the second image data represents the guest;

determining that a current position of the guest within the environment is outside of the designated zone based, at least in part, on the portion of the second image data representing the guest; and sending a fourth message to a user device, the fourth message indicating that the guest is outside of the designated zone.

9. The method as recited in claim 6, wherein the guest is to perform a delivery of a physical package, and wherein the method further comprises:

identifying an item being delivered within the environment for the delivery;

determining, based at least in part on analyzing the portion of the image data, a size of the object; and determining that the object is associated with the item based, at least in part, on the size of the object corresponding to a predetermined size of the item, and wherein determining that the guest is within the environment is further based, at least in part, on determining that the object is associated with the item.

10. The method as recited in claim 6, wherein the guest is to perform a delivery of a physical package, the camera apparatus comprises a first camera apparatus, and the image data comprises first image data, and wherein the method further comprises:

identifying a type of item being delivered within the environment for the delivery;

determining, based at least in part on the type of item, a designated zone within the environment for performing the delivery;

receiving, from a second camera apparatus, second image data representing an additional area within the environment;

determining that the additional area corresponds to the designated zone based, at least in part, on a location of the second camera apparatus within the environment;

determining that a portion of the second image data represents the guest; and determining, based at least in part on the portion of the second image data representing the guest, that a current position of the guest is within the designated zone.

11. The method as recited in claim 6, wherein the guest is to perform a delivery of a physical package, the camera apparatus comprises a first camera apparatus, and the image data comprises first image data, and wherein the method further comprises:

identifying a type of item being delivered within the environment for the delivery;

determining, based at least in part on the type of item, a designated zone within the environment for performing the delivery;

receiving, from a second camera apparatus, second image data representing an additional area within the environment;

determining that the additional area is outside of the designated zone based, at least in part, on a location of the second camera apparatus within the environment;

determining that a portion of the second image data represents the guest;

determining, based at least in part on the portion of the second image data representing the guest, that a current position of the guest is outside of the designated zone; and sending a fifth message to a user device, the fifth message indicating that the guest is outside of the designated zone.

12. The method as recited in claim 6, further comprising:
identifying an item that the guest should be in possession of while within the environment;

analyzing the image data using object recognition;

determining, based at least in part on analyzing the image data, that a portion of the image data represents the item; and determining that the guest is in possession of the item based, at least in part, on the portion of the image data representing the item, and wherein determining that the guest is within the environment is further based, at least in part, on determining that the guest is in possession of the item.

13. The method as recited in claim 6, wherein the camera apparatus comprises a first camera apparatus and the image data comprises first image data, and wherein the method further comprises:
receiving, from the first camera apparatus or a second camera apparatus, second image data representing an outer area of the environment;

determining that a portion of the second image data represents the guest; and determining that a position for the guest is within the outer area of the environment, and wherein determining that the guest is leaving the environment is based, at least in part, on the position.

14. An electronic device comprising:
one or more processors; and
one or more computer-readable media storing computer-instructions that, when executed by the one or more processors, cause the one or more processors to perform acts comprising:
storing first data representing a guest;
storing second data indicating a designated zone for the guest within an environment;
sending a message to a device located at the environment, the message including an instruction to provide access to the environment;
based at least in part on sending the message, receiving, from a camera apparatus, image data representing an area within the environment;
determining that the area is associated with the designated zone for the guest based, at least in part, on a location of the camera apparatus within the environment and the second data;
analyzing the image data with respect to the first data representing the guest;
determining, based at least in part on analyzing the image data, that a portion of the image data represents the guest; and
determining, based at least in part on the portion of the image data representing the guest, that a position of the guest is within the designated zone.

15. The electronic device as recited in claim 14, the acts further comprising:
receiving, from another camera apparatus, additional image data representing an additional area within the environment;
determining that the additional area is outside of the designated zone for the guest based, at least in part, on a location of the additional camera apparatus within the environment;
determining that a portion of the additional image data represents the guest;
determining, based at least in part on the portion of the additional image data representing the guest, that a new position of the guest is outside of the designated zone; and
sending an additional message to an electronic device, the additional message indicating that the guest is outside of the designated zone.

16. The electronic device as recited in claim 14, the acts further comprising receiving an additional message designating:
the designated zone as a first area within the environment in which the guest is authorized; and
an additional designated zone within the environment as a second area within the environment in which the guest is not authorized.

17. The electronic device as recited in claim 14, the acts further comprising determining, based at least in part a type of service being performed by the guest within the environment, the designated zone for the guest.

18. The electronic device as recited in claim 14, wherein the guest is to perform a delivery of a physical package, and wherein the acts further comprise:
identifying an item being delivered at the environment for the delivery; and
determining, based at least in part on the item, the designated zone for the guest.

19. The electronic device as recited in claim 14, the acts further comprising:
receiving, from an additional camera apparatus, additional image data representing an additional area of the environment;
determining, based at least in part on the additional image data, that an object is in the environment; and
determining that the object is the guest.

20. The method as recited in claim 6, wherein:
the object is the guest;
the data representing the object comprises facial-recognition data representing the guest; and
the analyzing the image data comprises analyzing, by the one or more computing devices, the image data using facial recognition and the facial-recognition data.

* * * * *